United States Patent
Midorikawa et al.

(10) Patent No.: US 8,893,998 B2
(45) Date of Patent: Nov. 25, 2014

(54) BELT RETRACTOR FOR A SEAT BELT SYSTEM

(75) Inventors: Yukinori Midorikawa, Kanagawa (JP); Hiroshi Yamada, Kanagawa (JP); Masuo Matsuki, Kanagawa (JP); Kiyoshi Ogawa, Kanagawa (JP)

(73) Assignee: Autoliv Development AB, Vårgårda (SE)

( * ) Notice: Subject to any disclaimer, the term of this patent is extended or adjusted under 35 U.S.C. 154(b) by 700 days.

(21) Appl. No.: 10/580,902

(22) PCT Filed: Nov. 29, 2004

(86) PCT No.: PCT/JP2004/018224
§ 371 (c)(1),
(2), (4) Date: May 26, 2006

(87) PCT Pub. No.: WO2005/051732
PCT Pub. Date: Jun. 9, 2005

(65) Prior Publication Data
US 2007/0095963 A1    May 3, 2007

(30) Foreign Application Priority Data
Nov. 27, 2003   (JP) ................................. 2003-436121

(51) Int. Cl.
*B60R 22/44* (2006.01)
*B60R 22/46* (2006.01)
*B60R 22/48* (2006.01)
*B60R 21/013* (2006.01)
*B60R 21/015* (2006.01)

(52) U.S. Cl.
CPC ........... *B60R 22/44* (2013.01); *B60R 2022/444* (2013.01); *B60R 2022/4816* (2013.01); *B60R 2021/01317* (2013.01); *B60R 2021/0155* (2013.01)
USPC ........................................ 242/374; 242/375.1

(58) Field of Classification Search
CPC ............ B60R 22/44; B60R 2022/4406; B60R 2022/444; B60R 2022/4666; B60R 2022/468; B60R 2022/469; B60R 2022/4816; B60R 2022/4825; B60R 2021/01317; B60R 2021/0155
USPC .......... 242/374, 375.1, 390.8, 390.9; 280/806, 280/807; 297/475–478; 180/268
See application file for complete search history.

(56) References Cited

U.S. PATENT DOCUMENTS 4,489,804 A * 12/1984 Kamijo .......................... 180/268
4,519,652 A *  5/1985 Kamijo .......................... 297/477
(Continued)

FOREIGN PATENT DOCUMENTS

DE     100 25 031 A1   11/2001
DE     202 06 667 U1    5/2002
(Continued)

*Primary Examiner* — Sang Kim
*Assistant Examiner* — Scott Haugland
(74) *Attorney, Agent, or Firm* — Brinks Gilson & Lione

(57) ABSTRACT

A spindle (2) of a seat belt retractor is rotationally driven when required by a motor (5) to the webbing take-up direction side through a power transmission mechanism section (6). Further, the spindle (2) is always connected to a take-up spring (7) and is always subjected to rotational power acting to the webbing take-up side. The structure enables a user wearing a seat belt to be restrained even in failure, realizing a safer and more reliable restraining device.

19 Claims, 25 Drawing Sheets

(56) References Cited

U.S. PATENT DOCUMENTS

| | | |
|---|---|---|
| 4,620,677 A | 11/1986 | Nagao et al. |
| 5,344,095 A | 9/1994 | Frei |
| 5,553,804 A * | 9/1996 | Hamann ................ 242/382.4 |
| 5,558,370 A * | 9/1996 | Behr ..................... 280/806 |
| 5,938,135 A | 8/1999 | Sasaki et al. |
| 6,012,667 A | 1/2000 | Clancy, III et al. |
| 6,332,629 B1 | 12/2001 | Midorikawa et al. |
| 6,425,541 B1 * | 7/2002 | Strobel .................... 242/371 |
| 6,427,935 B1 | 8/2002 | Fujii et al. |
| 6,485,057 B1 * | 11/2002 | Midorikawa et al. ........ 280/807 |
| 6,499,554 B1 * | 12/2002 | Yano et al. ................ 180/268 |
| 6,561,299 B2 * | 5/2003 | Midorikawa et al. ........ 180/268 |
| 6,616,186 B1 | 9/2003 | Midorikawa et al. |
| 6,626,463 B1 | 9/2003 | Arima et al. |
| 6,641,075 B2 | 11/2003 | Specht |
| 2001/0004030 A1 * | 6/2001 | Yano et al. ................ 180/268 |
| 2002/0024211 A1 * | 2/2002 | Yano et al. ................ 280/806 |
| 2002/0129986 A1 * | 9/2002 | Aoki ...................... 180/268 |
| 2002/0189880 A1 * | 12/2002 | Tanaka et al. ............. 180/268 |
| 2003/0201359 A1 * | 10/2003 | Peter ..................... 242/390.9 |

FOREIGN PATENT DOCUMENTS

| | | |
|---|---|---|
| DE | 102 04 475 A1 | 8/2003 |
| DE | 102 04 477 | 8/2003 |
| EP | 0 627 345 | 3/1997 |
| JP | 60-4447 | 1/1985 |
| JP | 1-144160 | 3/1989 |
| JP | 5-162614 | 6/1993 |
| JP | 2000-38110 | 2/2000 |
| JP | 2001-334913 | 12/2001 |
| JP | 2004-9967 | 6/2002 |
| WO | WO 01/85495 A2 | 11/2001 |
| WO | WO 2005/021339 A1 | 3/2005 |

* cited by examiner

WEBBING WINDING DIRECTION

SINCE THE CLUTCH MECHANISM IS STOPPED WITH RESPECT TO A ROTATION OF THE SPINDLE SIDE PULLEY, THE CUSHION MEMBER (COIL SPRING) IS COMPRESSED.

⇒ ROTARY DIRECTION OF EACH PULLEY (WEBBING WINDING DIRECTION)
⇒ FORCE FOR COMPRESSING CUSHION MEMBER (COIL SPRING)

WHILE THE CUSHION MEMBER (COIL SPRING) IS NOT BEING COMPRESSED, THE SPINDLE SIDE PULLEY AND THE CLUTCH MECHANISM SECTION ARE SIMULTANEOUSLY ROTATED.

⇐⇒ : ENGAGED AT ALL TIME
⇐⇒ : ENGAGED WHEN NECESSARY

BELT RETRACTOR FOR A SEAT BELT SYSTEM

CROSS REFERENCE TO RELATED APPLICATIONS

This application claims priority to JP 2003-436121 filed Nov. 27, 2003 and PCT/JP2004/018224, filed Nov. 29, 2004.

BACKGROUND

1. Technical Field

The present invention relates to a retractor for a seat belt system. More particularly, the present invention relates to a retractor for a seat belt mounted in a vehicle providing a restricting device which can be positively operated.

2. Background Art

A retractor is disclosed in Japanese Patent Unexamined Publication No. JP-A-2000-038110 and Japanese Patent Unexamined Publication No. JP-A-2001-334913.

An electric retractor described in the above-referenced Japanese Patent Documents includes: a frame; a reel shaft pivotally attached to the frame which winds a seat belt; and a lock mechanism for locking the seat belt so that it can not be drawn out when a predetermined deceleration acts on a vehicle or when the seat belt is drawn out at a predetermined acceleration. A central axis of the reel shaft is connected to a central axis of a pulley for the reel shaft, and the pulley for the reel shaft is connected to a pulley for DC motor via a power transmission belt. A central axis of the pulley for DC motor is connected to DC motor. Accordingly, power of the DC motor is transmitted to the reel shaft. Rotation of the reel shaft, which rotates when a user draws out the seat belt, is also transmitted to DC motor.

Further, various control is performed on the DC motor by MPU (Micro Processing Unit) via DC motor drive system. MPU is connected to a vehicle speed detecting system for detecting a running speed of the vehicle. MPU is also connected to a collision prediction detecting system for detecting whether or not there is a possibility of collision. MPU is also connected to a buckle connecting detection system for detecting whether or not the user fastens the seat belt. According to the result of the detection, the DC motor is driven.

However, in the above conventional design, electric power is required to wind the webbing by the DC motor. Therefore, in the case of the occurrence of trouble in which the motor can not be driven for some reasons or the electric power supply is stopped, it becomes impossible to wind the webbing. Accordingly, in the case of the above malfunction, there is a possibility that the user is not restricted by the seat belt in a desired condition.

The present invention addresses the above shortcomings of the prior art. It is an object of the present invention to provide a retractor for a seat belt capable of positively restricting a user of the seat belt so even at the time of the occurrence of malfunction in which the motor is not operated or the supply of electric power is stopped.

SUMMARY OF THE INVENTION

According to a first aspect of the invention, there is provided a retractor for a seat belt comprising:
a spindle on which a webbing is wound;
a frame for pivotally holding the spindle;
a drawing prevention system for preventing the webbing from drawing such that:

stopping a rotation of the spindle rotating in a drawing out direction, in which the webbing is drawn out, when a rotational acceleration of the spindle is not less than a predetermined value when the webbing is accelerated in the drawing out direction; and stopping a rotation of the spindle rotating in the drawing out direction when a deceleration of a vehicle is not less than a predetermined value; and a first torque generating system which generates torque to rotate the spindle in a winding direction in which the webbing is wound, and connected to the spindle at all times so as to transmit the generated torque to the spindle;

a second torque generating system which generates torque to rotate the spindle in the winding direction; and a torque transmitting mechanism system which transmits the torque generated by the second torque generating system to the spindle, wherein the torque generated by the first torque generating system is made to be lower than the torque generated by the second torque generating system, so as to maintain a rotary speed of the spindle generated by the first torque generating system to be lower than a rotary speed of the spindle generated by the second torque generating system, and the second torque generating system is used repeatedly.

According to a second aspect of the invention, it is preferable that the first torque generating system generates torque by a rotary spring force of a spiral spring, and the second torque generating system generates torque by torque of a motor.

According to a third aspect of the invention, it is preferable that when the second torque generating system generates the torque for rotating the spindle in the winding direction, the torque transmitting mechanism system transmits the torque generated by the second torque generating system to the spindle, and when the second torque generating system generates the torque for rotating the spindle in a direction opposite to the direction in which the second torque generating system generates torque for rotating the spindle in the winding direction, the torque transmitting mechanism system does not transmit torque generated by the second torque generating system to the spindle.

According to a fourth aspect of the invention, it is preferable that a torque setting is made in advance in the first torque generating system so that a predetermined tension is generated in the webbing when a seat belt user fastens the seat belt.

According to a fifth aspect of the invention, it is preferable that the torque transmitting mechanism system includes a torque transmission cushioning system for cushioning a torque transmission by an elastic member arranged between the second torque generating system and the spindle, wherein when the torque of the second torque generating system is transmitted to the spindle, a sudden change in the torque of the second torque generating system is not transmitted to the spindle as a sudden change in torque, and when the torque of the second torque generating system is transmitted to the spindle, a sudden force in a direction of drawing out the webbing given to the spindle, which is generated when a seat belt user gives a sudden force to the webbing in the drawing out direction, is not transmitted to the second torque generating system as a sudden change in force.

According to a sixth aspect of the invention, it is preferable that an elastic force of the elastic member in the torque transmission cushioning system is larger than the force generated by the first torque generating system.

According to a seventh aspect of the invention, it is preferable that further comprising:

a webbing action detecting system for detecting whether the webbing is drawn out, the webbing is wound or the webbing is in a stopping state; and a control system for controlling the torque of the second torque generating system according to:

whether or not the seat belt is fastened which is detected by a seat belt fastening detection system which is integrated into a buckle and detects whether or not a tongue is engaged with the buckle, and an action of the webbing detected by the webbing action detecting system.

According to an eighth aspect of the invention, it is preferable that when the seat belt fastening detecting system detects a change from a state of fastening the seat belt to a state of not-fastening the seat belt, in a case where the state of not-fastening the seat belt is detected and the seat belt fastening detecting system detects that the webbing is in a stoppage state, the control system makes the second torque generating system generate a predetermined level of the torque for rotating the spindle in the winding direction.

According to a ninth aspect of the invention, it is preferable that when a state of not-fastening the seat belt and a state of drawing out of the webbing are detected, in a case where a state of not-fastening of the seat belt and a state of a stoppage of the webbing are detected, the control system controls so that the second torque generating system generates a predetermined level of the torque for rotating the spindle in the winding direction.

According to a tenth aspect of the invention, as set forth in one of the first through ninth aspect of the invention, it is preferable that when a state of not-fastening of the seat belt and a state of stoppage of the webbing are detected although the torque of rotating the spindle is generated in the winding direction by an action of the second torque generating system, the control system stops the generation of the torque by the second torque generating system for a predetermined period of time, and then the control system controls to generate the torque, a direction of which oppose to the direction of the torque for rotating the spindle in the winding direction.

According to an eleventh aspect of the invention, it is preferable that when the change from the state of not-fastening the seat belt to the state of fastening the seat belt is detected, the control system makes the second torque generating system generate the torque for rotating the spindle in the winding direction, and when the state of stoppage of the webbing is detected, the control system makes the second torque generating system generate torque, a direction of which opposes to the direction of the torque for rotating the spindle in the winding direction for a predetermined period of time.

According to a twelfth aspect of the invention, it is preferable that the webbing action detecting system detects a rotation and a rotary direction of the spindle and when a change in amount of the rotation of not less than a predetermined value is detected in a predetermined period of time and a rotation of the spindle is detected on a side of drawing out the webbing, the webbing action detecting system judges that the webbing is drawn out, when the rotation of the spindle is detected on a side of winding the webbing, the webbing action detecting system judges that the webbing is wound, and when a change in amount of rotation of not less than a predetermined value is not detected in a predetermined period of time, the webbing action detection system judges that the webbing is in a state of stoppage.

According to a thirteenth aspect of the invention, it is preferable that when a collision is detected or impeding as a state detected by a collision detecting system, which is separately provided and detects whether or not a vehicle is in a dangerous state, and a state that a user fastens the seat belt are detected, the control system makes the second torque generating system generate the torque for rotating the spindle in the winding direction.

According to a fourteenth aspect of the invention, it is preferable that when the state of fastening the seat belt and the change from the dangerous state of the vehicle to the not-dangerous state are detected, the control system makes the second torque generating system generate the torque, an intensity of which is higher than an intensity of the torque for rotating the spindle, in the winding direction for a predetermined period of time; and also makes the second torque generating system gradually reduce the torque with lapse of time; and after no torque is generated, the control system controls so that a predetermined intensity of torque for rotating the spindle is generated for a predetermined period of time in a direction opposite to the winding direction.

According to a fifteenth aspect of the invention, it is preferable that the retractor for the seat belt further comprising a control system for controlling the torque generated by the second torque generating system according to a seat belt fastening state detected by a seat belt fastening state detecting system, which is incorporated into a buckle and detects whether or not a tongue is engaged with the buckle, and according to an actual or potential collision is detected by a collision detecting system for detecting whether or not a vehicle is in a collision.

According to a sixteenth aspect of the invention, it is preferable that when the state of fastening the seat belt and the dangerous state of the vehicle are detected, the control system makes the second torque generating system generate the torque for rotating the spindle in the winding direction.

According to a seventeenth aspect of the invention, it is preferable that when the state of fastening the seat belt and the change from the dangerous state of the vehicle to the not-dangerous state are detected, the control system makes the second torque generating system generate the torque, a level for rotating the spindle in the winding direction for a predetermined period of time; and then the control system makes the second torque generating system gradually reduce the torque with lapse of time; and after no torque is generated, the control system makes the second torque generating system generate a predetermined torque for rotating the spindle in a direction opposite to the winding direction for a predetermined period of time.

According to an eighteenth aspect of the invention, it is preferable that when the dangerous state of the vehicle and the change from the state of fastening the seat belt to the state of not-fastening the seat belt are detected, the control system makes the second torque generating system generate a predetermined torque for rotating the spindle in the direction opposite to the winding direction for a predetermined period of time.

According to a another aspect of the invention, it is preferable that while the control system controls so that the second torque generating system generates a rotary torque in a direction opposite to the direction of winding the webbing with respect to the spindle and when an amount of the drawn webbing being not less than a predetermined value is detected by the webbing detecting system, the control system controls the second torque generating system to increase a rotary speed.

According to the constitution of the retractor for a seat belt of the present invention, even in the case of trouble in which a motor does not work or an electric torque source is shut off, at least it is possible to restrict a passenger fastening the seat belt at present. Therefore, it is possible to realize a safer and more secure restricting device.

Additional benefits and advantages of the present invention will become apparent to those skilled in the art to which the present invention relates from the subsequent description of the preferred embodiment and the appended claims, taken in conjunction with the accompanying drawings.

BEST MODE FOR CARRYING OUT THE INVENTION

Figure 1:
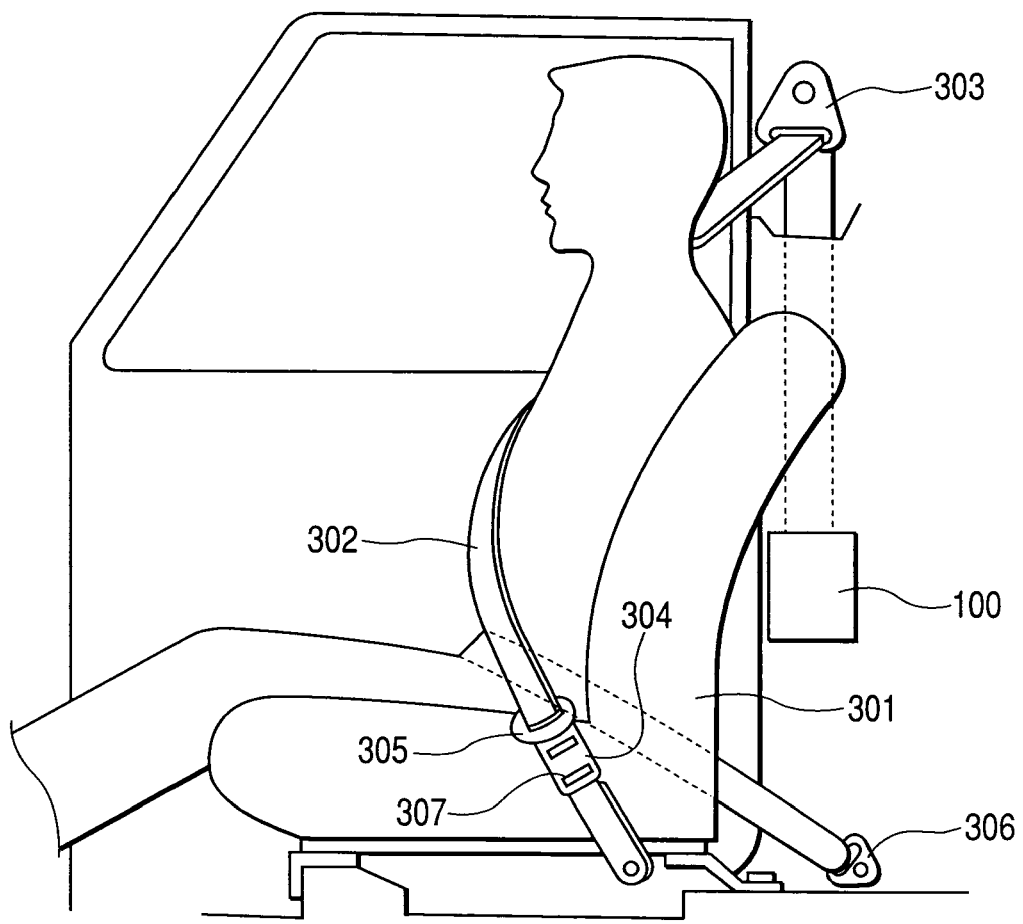
FIG. 1 is an external appearance view showing circumstances of a use of a seat belt device of a vehicle of a first embodiment of the present invention.

A retractor for a seat belt of an embodiment of the present invention includes: a spindle on which a webbing is wound; a frame for pivotally holding the spindle; a drawing prevention system for preventing the webbing from drawing such that: stopping a rotation of the spindle rotating in a drawing out direction, in which the webbing is drawn out, when a rotational acceleration of the spindle is not less than a predetermined value when the webbing is accelerated in the drawing out direction; and stopping a rotation of the spindle rotating in the drawing out direction when a deceleration of a vehicle is not less than a predetermined value; and a first torque generating system which generates torque to rotate the spindle in a winding direction in which the webbing is wound, and connected to the spindle at all times so as to transmit the generated torque to the spindle.

In this best mode for carrying out the invention, the retractor for a seat belt further includes: a second torque generating system which generates torque to rotate the spindle in the winding direction; and a torque transmitting mechanism system which transmits the torque generated by the second torque generating system to the spindle, wherein the torque generated by the first torque generating system is made to be lower than the torque generated by the second torque generating system, so as to maintain a rotary speed of the spindle generated by the first torque generating system to be lower than a rotary speed of the spindle generated by the second torque generating system, and the second torque generating system is used repeatedly.

This embodiment separately includes a collision or potential collision detecting system for judging a possibility of collision with an obstacle located in a front side of the vehicle and/or at a rear side of the vehicle and/or on sides of the vehicle. This dangerous state detecting system operates as follows. A distance from the vehicle to the obstacle is detected by a distance measuring sensor. From a relative speed found by a change in the distance to the obstacle with respect to the time, a period of time of the collision with the obstacle is calculated. When the thus calculated period of time is not more than a predetermined value, it is judged that the vehicle is in a dangerous state.

First Embodiment

Referring to the drawings, the first embodiment of the present invention will be explained below.

Figure 2:
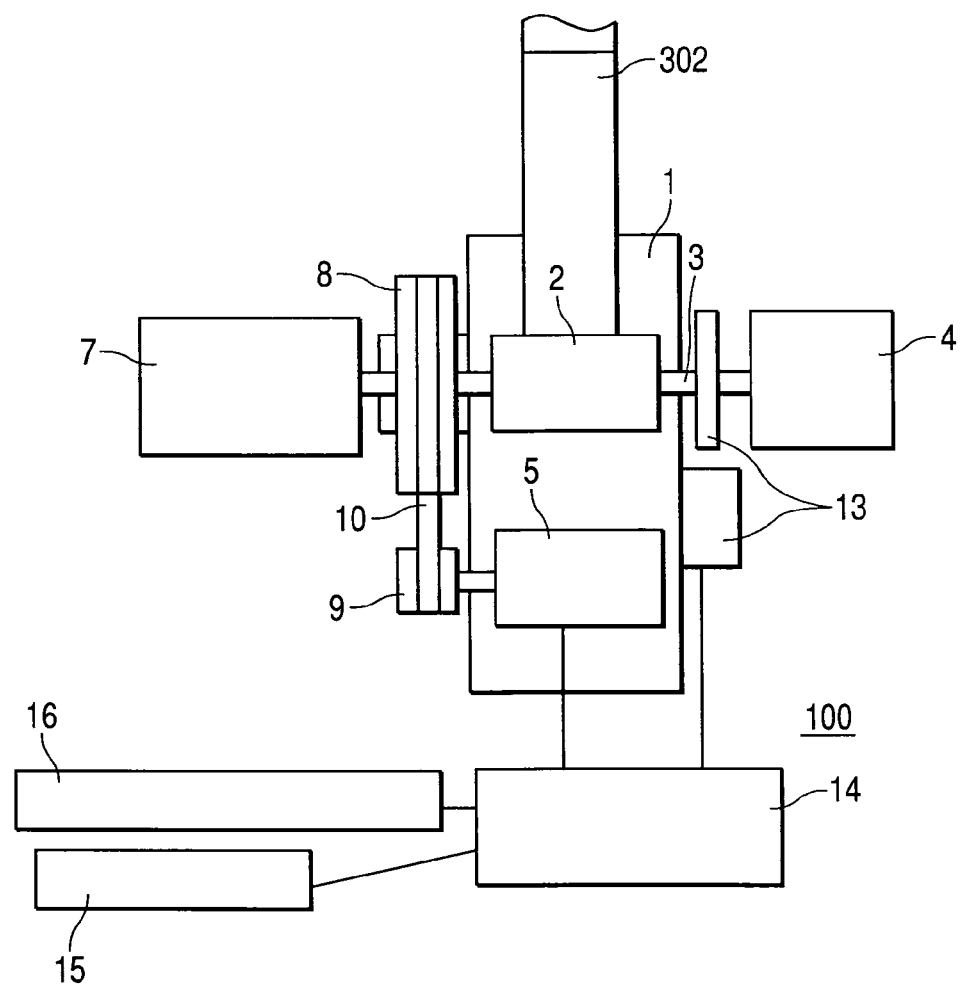
FIG. 2 is a functional block diagram schematically showing a structure of a retractor for a seat belt of a first embodiment.
Figure 7:
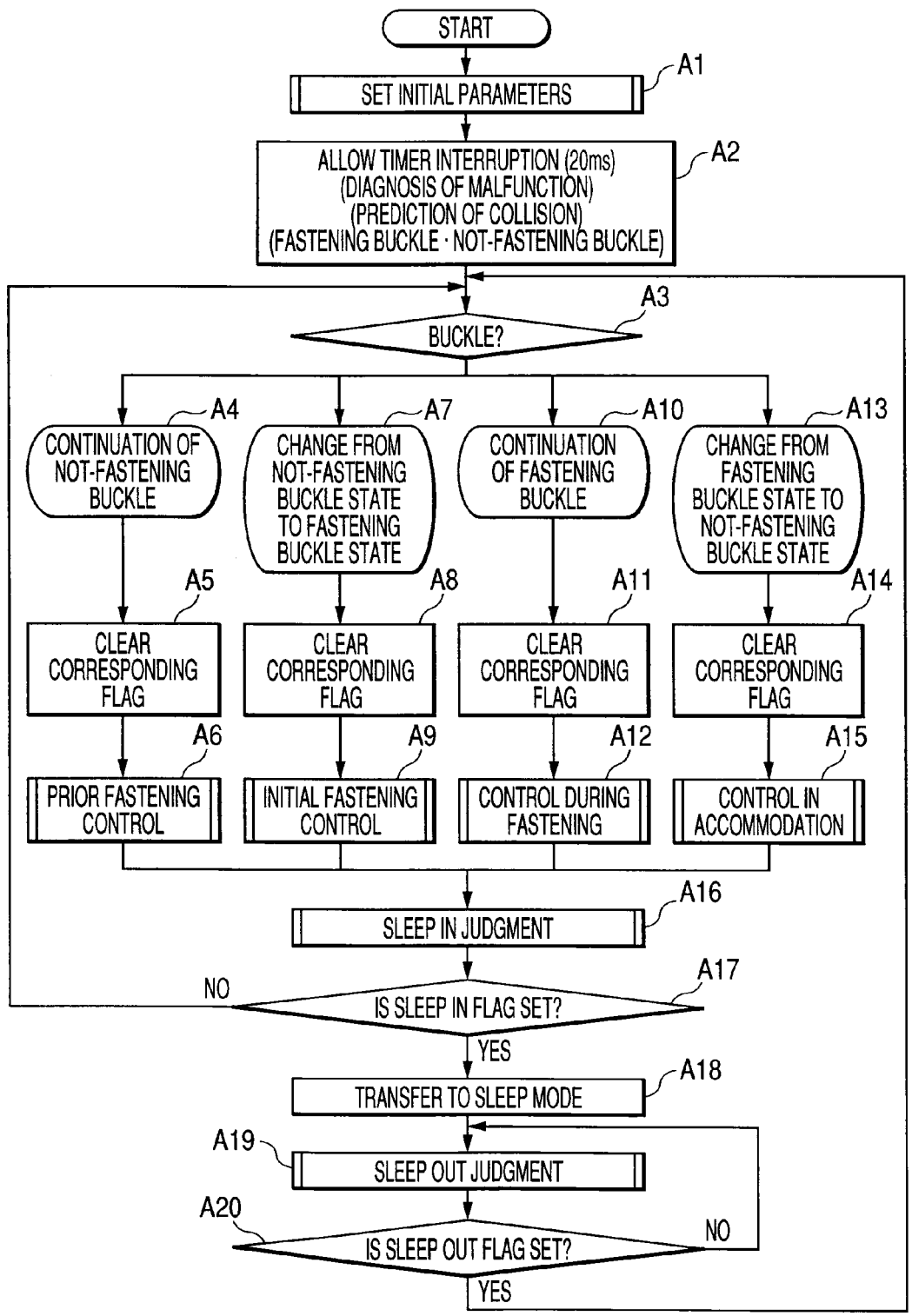
FIG. 7 is a main flow chart for explaining an action of a micro-controller in a control system.

FIG. 1 is an external appearance view showing circumstances of the use of a seat belt device of a vehicle of the first embodiment of the present invention. FIG. 2 is a functional block diagram schematically showing a structure of a retractor for a seat belt of the first embodiment of the present invention. FIG. 7 is a main flow chart for explaining an action of a micro-controller in a control system.

Figure 6:
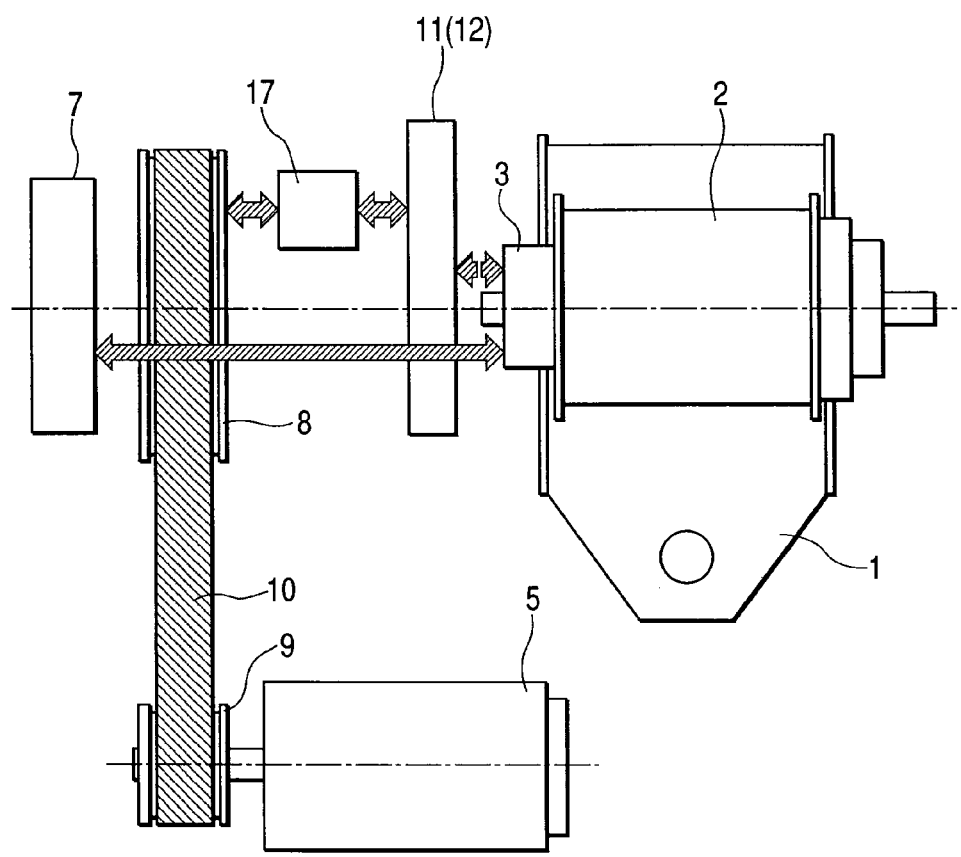
FIG. 6 is a functional block diagram schematically showing a structure of the retractor for a seat belt of a first embodiment.

As shown in FIG. 1, the seat belt device of this embodiment includes: a retractor 100 for a seat belt to which one end side of a webbing 302 for restricting a passenger in a seat 301 is attached; a through-anchor 303 for turning the webbing 302 at a position close to a shoulder portion of the passenger; a tongue plate 305 engaging with a buckle 304, which is arranged at the waist portion of the passenger and into which the webbing 302 is inserted; an anchor plate 306 for fixing the other end portion of the webbing 302 to a vehicle body; a buckle switch 307, which is integrated into the buckle 304 and detects that the passenger has fastened the webbing 302; and a control system 14 (shown in FIG. 2) for controlling a motor 5 (shown in FIG. 6) of the retractor 100 for the seat belt.

As shown in FIG. 2, the retractor 100 for the seat belt of this embodiment is provided with a frame 1. This frame 1 includes: a spindle 2 on which the webbing 302 is wound; and a spindle shaft 3 connected to the left end side of the spindle 2, wherein this spindle shaft 3 is a rotational axis of the spindle rotation. A drawing preventing system or retractor locking system 4 for locking the webbing 302 from being drawn out is provided on the right end side of the spindle shaft 3. The drawing preventing system 4 is of a well known type. This drawing preventing system 4 has a function of locking the webbing 302 from being drawn out when a predetermined deceleration acts on the vehicle. This drawing preventing system 4 also has a function of locking the webbing 302 from being drawn out when the webbing 302 is drawn out at a predetermined acceleration. The drawing preventing system 4 is structured in such a manner that even when the webbing 302 is locked, the webbing 302 can be wound by the motor (the second torque generating system) 5.

Figure 3:
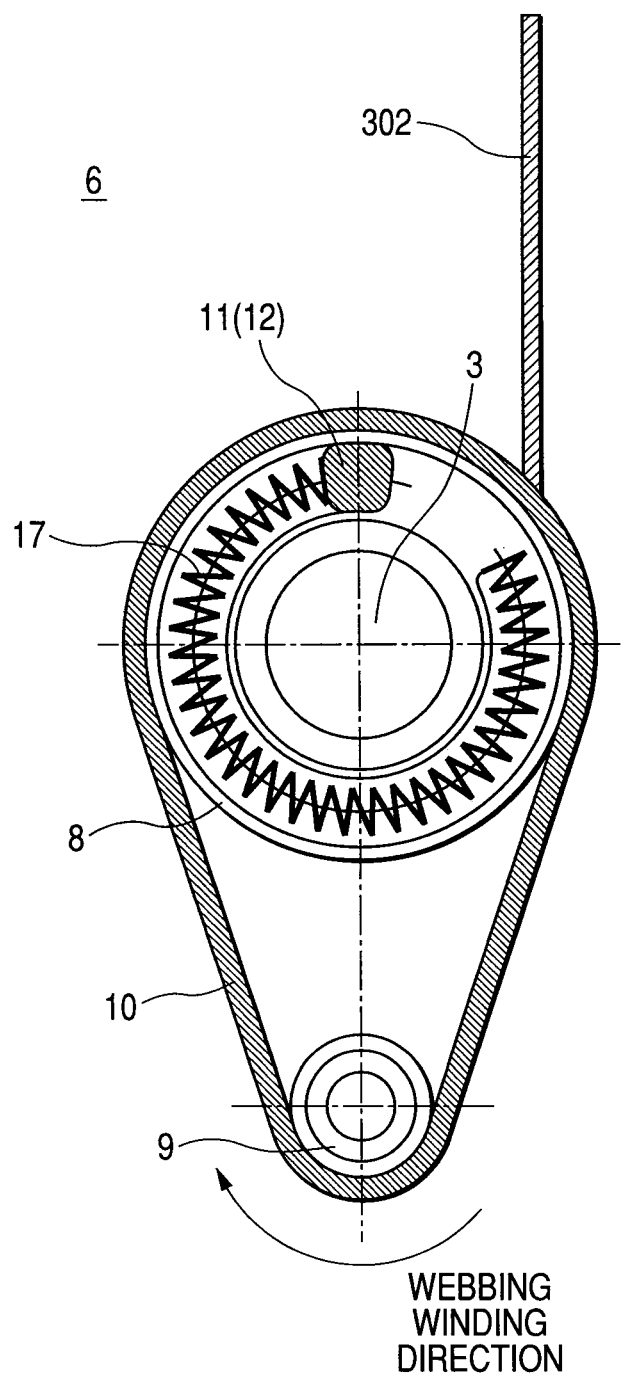
FIG. 3 is a functional block diagram schematically showing a structure of the retractor for a seat belt of a first embodiment.

When necessary, the spindle 2 can be rotated onto the webbing winding side by the motor 5 via the torque transmitting mechanism system 6 as shown in FIG. 3. The spindle 2 is connected to the winding spring (the first torque generating system) 7 at all times.

Figure 4:
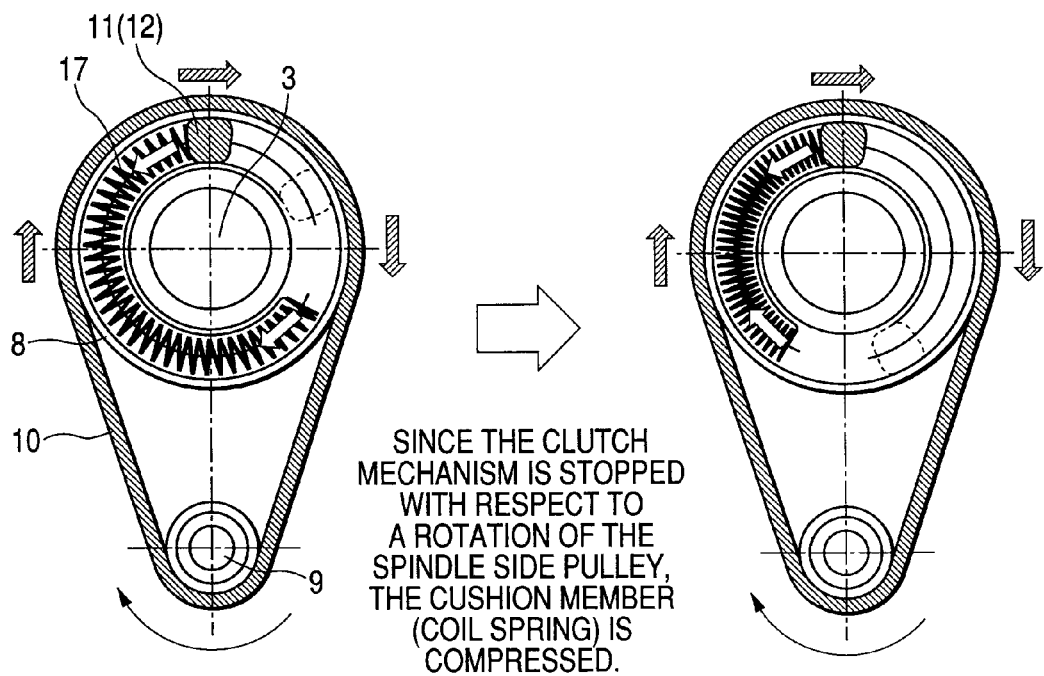
FIG. 4 is a functional block diagram schematically showing an action of the retractor for a seat belt of a first embodiment.
Figure 5:
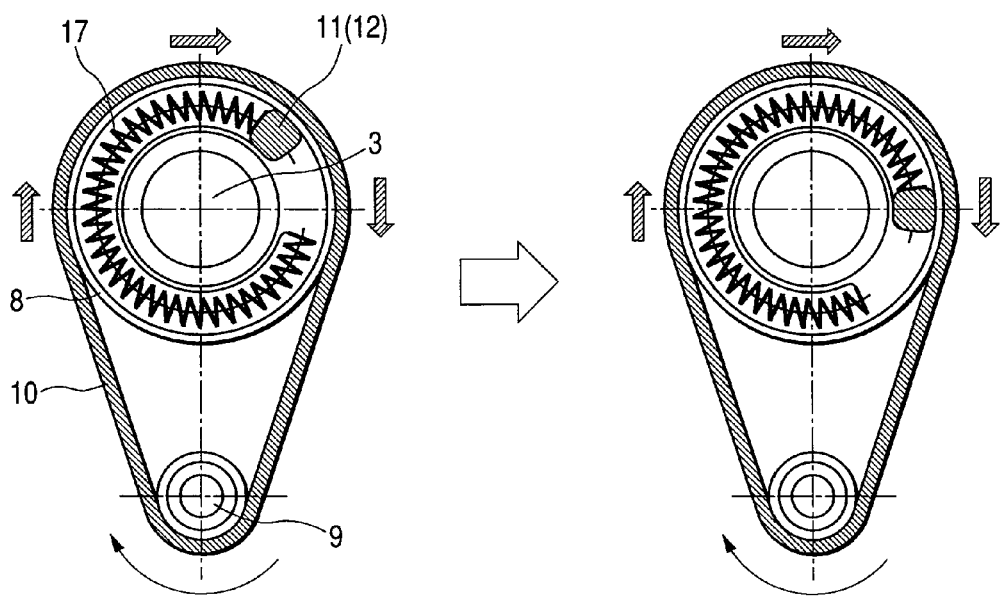
FIG. 5 is a functional block diagram schematically showing an action of the retractor for a seat belt of a first embodiment.

As shown in FIG. 3, the torque transmitting mechanism system 6 includes: a spindle side pulley 8 fixed to the spindle shaft 3; a motor side pulley 9 fixed to the rotary shaft of the motor 5; a timing belt 10 provided between both pulleys 8, 9; a clutch housing 12 which receives a force on the spindle side pulley 8 when a clutch 11, which is arranged in the spindle side pulley 8, is connected when the motor 5 is rotated so as to wind the webbing; and a torque transmission cushioning member (a coil spring) 17, which is arranged in the spindle side pulley 8 and fixed to the spindle shaft 3, for conducting a cushioning action between the clutch housing 12 and only the winding side of the spindle shaft 3. FIG. 5 is a view showing circumstances in which the spindle side pulley 8 and the clutch mechanism system 11, 12 are simultaneously rotated without giving a compression to the torque transmitting cushion member (coil spring) 17. FIG. 4 is a view showing circumstances in which the torque transmitting cushion member (coil spring) 17 is compressed because the clutch mechanism system 11, 12 is stopped with respect to a rotation of the spindle side pulley 8.

As shown in FIG. 2, a webbing action detecting system 13, which detects a rotary speed and a rotary direction of the spindle shaft 3 so as to detect the webbing action, is provided in the frame 1. This webbing action detecting system 13 is composed in such a manner that, for example, a magnetized disk, in which N-pole and S-pole are alternately formed, is fixed to the spindle shaft 3. Therefore, a signal generated by the electromagnetic induction is transmitted to the control system 14. The buckle switch 307 is integrated into the buckle 304 and detects whether or not the seat belt is fastened by a passenger and supplies a signal of fastening the seat belt to the control system 14.

The collision detecting system 15 judges a possibility of collision with an obstacle located, for example, in the front side of the vehicle and/or at the rear side of the vehicle and/or on the transversal sides of the vehicle. This collision detecting system operates as follows. A distance from the vehicle to the obstacle is detected by a distance measuring sensor. From a relative speed found by a change in the distance to the obstacle with respect to the time, a period of time at the collision with the obstacle is calculated. When the thus calculated period of time is not more than a predetermined value, it is judged that the vehicle is in a dangerous state, and the dangerous state detecting system supplies a signal corresponding to the dangerous state to the control system 14. In the control system 14, a drive circuit for driving the motor 5 is provided. The motor 5 is driven by a signal sent from a micro-controller to be described later. A rotation of the spindle 2 is detected by (1) a magnetized disk, which is arranged on the spindle shaft 3 and in which N-pole and S-pole are alternately formed on an outer circumference thereof; and (2) by two hole sensors arranged so as to output signals of which phases are shifted from each other by ¼ period. Pulse rows $\phi 1$ and $\phi 2$ of two phases are generated, and a rotary direction and an amount of rotation (a rotary angle) are transmitted to the control system 14. The pulse rows $\phi 1$ and $\phi 2$ are digitized by an up-down counter on an input and output interface in the control system 14 and changed into an output corresponding to an amount of drawing of the webbing 302.

The control system 14 includes: a not shown micro controller (not shown) having CPU (Central Processing Unit) for executing various control programs, RAM for storing various processing data, ROM for storing various programs, a built-in timer and an input and output interface for conducting a signal conversion; and also the control system 14 includes a drive circuit not shown for driving the motor 5 according to an output from the micro-controller. According to the signals sent from the buckle switch 307 and the collision detecting system 15, the input and output interface not shown sets a belt fastening flag and a dangerous flag at a flag register (or RAM). In the flag register not shown, CPU watches an amount of the drawing of the webbing via the input and output interface and sets various flags. For example, concerning the amount of the drawing of the webbing which is periodically watched, from a difference between the value obtained at the watching of the last time and the value obtained at the watching of the present time, a drawing flag showing the drawing of the webbing 302, a winding flag showing the winding of the webbing 302 or a stopping flag showing a state of stoppage, in which the webbing 302 is not drawn or wound, is set in the flag register.

When a reference is made to various flags, it is possible for the micro-controller (CPU) of the control system 14 to judge the drawing of the webbing 302, the winding of the webbing 302, the stopping of the webbing 302, the fastening of the seat belt and the dangerous state. On the basis of the above judgment, the control system 14 controls the motor 5.

FIG. 7 is a main flow chart for explaining an action of the micro-controller (CPU) in the control system 14. Electric torque is supplied to the control system 14 from a battery line provided in the vehicle. The start shown in FIG. 7 is executed when the retractor of this embodiment is incorporated into the vehicle and the control system 14 is connected to the battery line. Accordingly, the initial parameter setting is not usually conducted but the initial parameter setting is conducted only when the device is initially incorporated into the vehicle or only when the battery is replaced for the reason of maintenance. Referring to the flow chart shown in FIG. 7, various actions of the micro-controller (CPU) of the control system 14 will be explained below.

Figure 8:
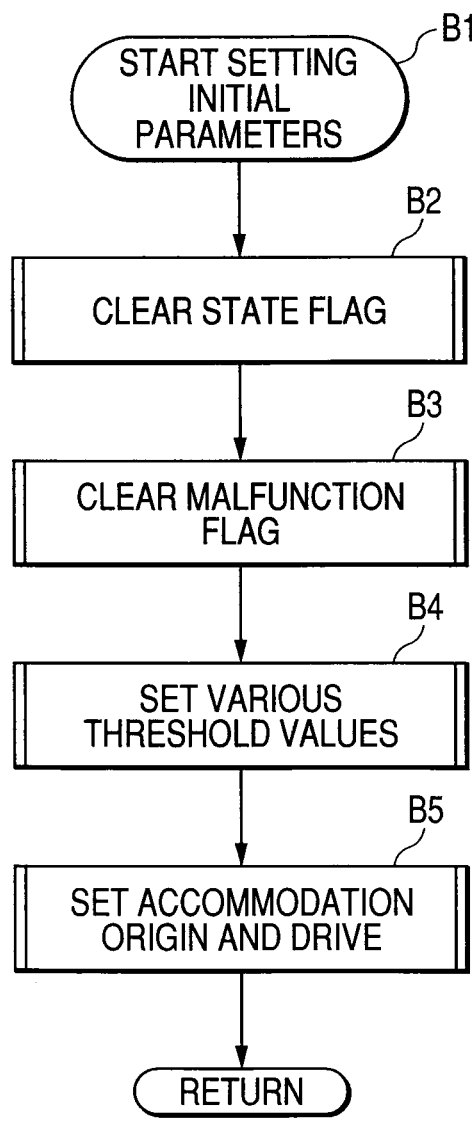
FIG. 8 is a flow chart for explaining an action of the micro-controller in the control system.

First of all, in step A1, the initial parameter shown in FIG. 8 is set. In this case, various registers are cleared (step B1). Next, various state flags relating to a belt action are cleared (step B2). Next, a failure flag is cleared (step B3). Next, various threshold values are respectively set at a predetermined value (step B4). Next, in order to set an accommodation origin, an accommodation origin set driving is conducted (step B5).

Figure 24:
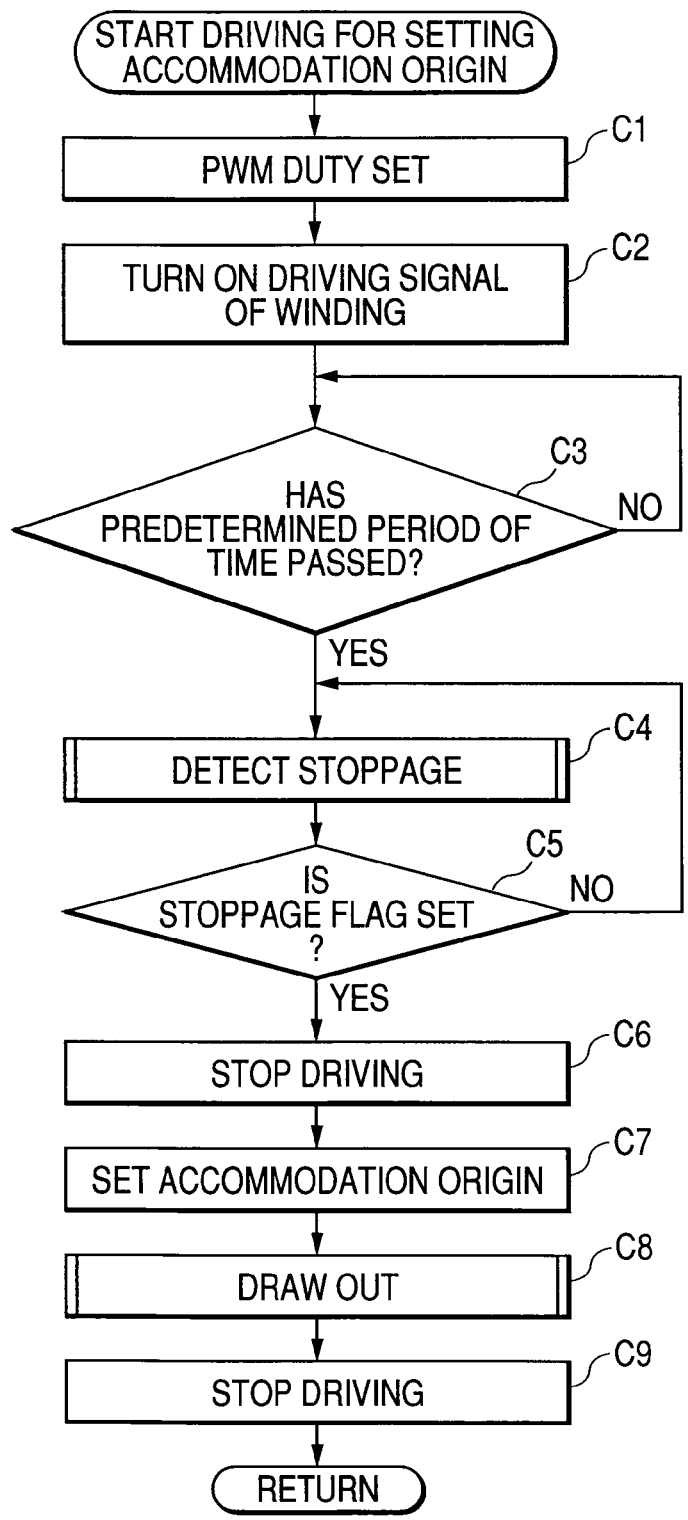
FIG. 24 is a flow chart for explaining an action of the micro-controller in the control system.

An operation procedure of the accommodation origin set driving is shown in FIG. 24 in detail. First, PWM (Pulse Width Modulation) duty ratio is set (step C1). Next, a winding drive signal is turned on (step C2) so as to drive the motor 5 for a predetermined period of time to wind the webbing by a predetermined winding force (step, C3). After a predetermined period of time has passed, a stopping detection described later (shown in FIG. 17) is conducted (step C4). Next, it is judged whether or not the stoppage flag is set (step C5). In the case where the stoppage flag is not set, the program returns to the stoppage detection (step C4). In the case where the stoppage flag is set, the motor 5 is stopped (step C6), and an amount of rotation of the spindle 2 detected by a rotation sensor not shown at this stopping position is set as an accommodation origin (step C7). After that, the program proceeds to step C8 and driving of drawing the webbing is conducted.

Figure 20:
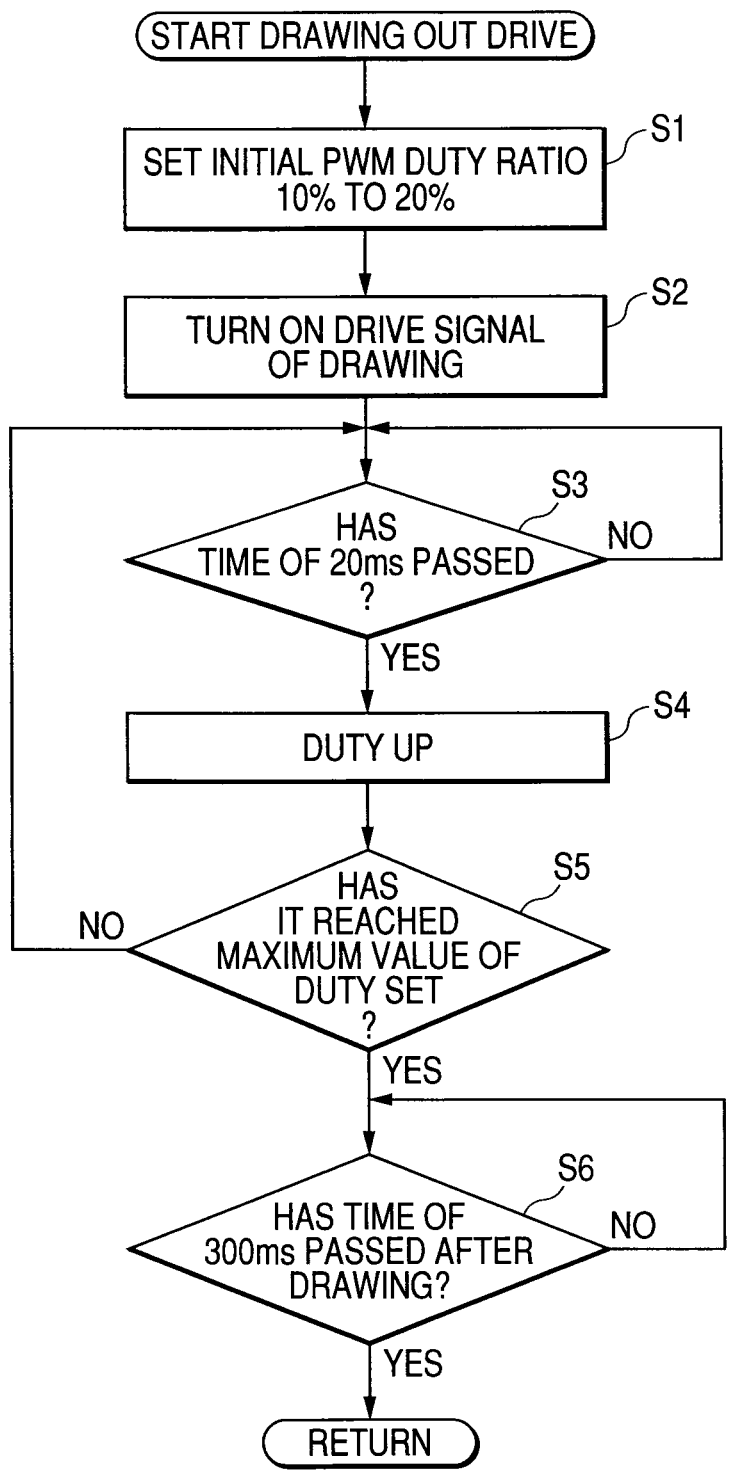
FIG. 20 is a flow chart for explaining an action of the micro-controller in the control system.

In this case, driving of drawing the webbing 302 (step C8) is conducted according to the drawing driving routine shown in FIG. 20. First, corresponding to the initial setting of the drawing speed, the duty ratio of PWM is initially set (step S1). In this embodiment, as the duty ratio of PWM, a specific value between 10% and 20% is initially set. Next, the drawing drive signal is turned on and drawing of the webbing is executed by the motor 5 (step S2). The duty ratio is increased for each 20 ms (step S3) by a predetermined amount and gradually increased (step S4). That is, an intensity of the winding force is gradually increased. Next, it is judged whether or not the duty ratio has reached the maximum value that has been set (step S5). In the case where the duty ratio has not reached the maximum value, the duty ratio up operation is successively conducted (steps S3, S4, S5). When the duty ratio has reached the maximum value, the program proceeds to the next step S6. In step S6, it is judged whether or not the time 300 ms has passed from the start of drawing the webbing. When the time 300 ms has passed, the program is returned. In this case, each value in the process of drawing (the initial PWM duty ratio: 10% to 20%, the lapse of time: 20 ms, 300 ms) is just an example. In the drawing driving conducted while a user is fastening the seat belt, each value is preferably a duty ratio by which a motor torque is given onto the drawing side, on which the motor 5 and the gear can be operated, so as to release the clutch 11. Each value is preferably a period of duty-up which is set so as to control the speed on the drawing side so that the drawing can not be locked by malfunction of WSI when the webbing 302 is suddenly drawn out by a reaction force given by the restricted passenger. Each value is preferably an amount of duty-up per one period. It is preferable that a drawing driving time is appropriately set to be not less than a predetermined period of time so that the spindle 2 can be rotated so as to sufficiently release the clutch 11 even when the webbing 302 is drawn out by the passenger before the release of the clutch is completed.

After the completion of drawing (after the completion of the processing routine shown in FIG. 20), returning to FIG. 24, the program proceeds to step C9, and the clutch 11 is released and the drive is stopped. Then, processing of the accommodation origin set driving is ended (end of step A1 in FIG. 7).

Figure 9:
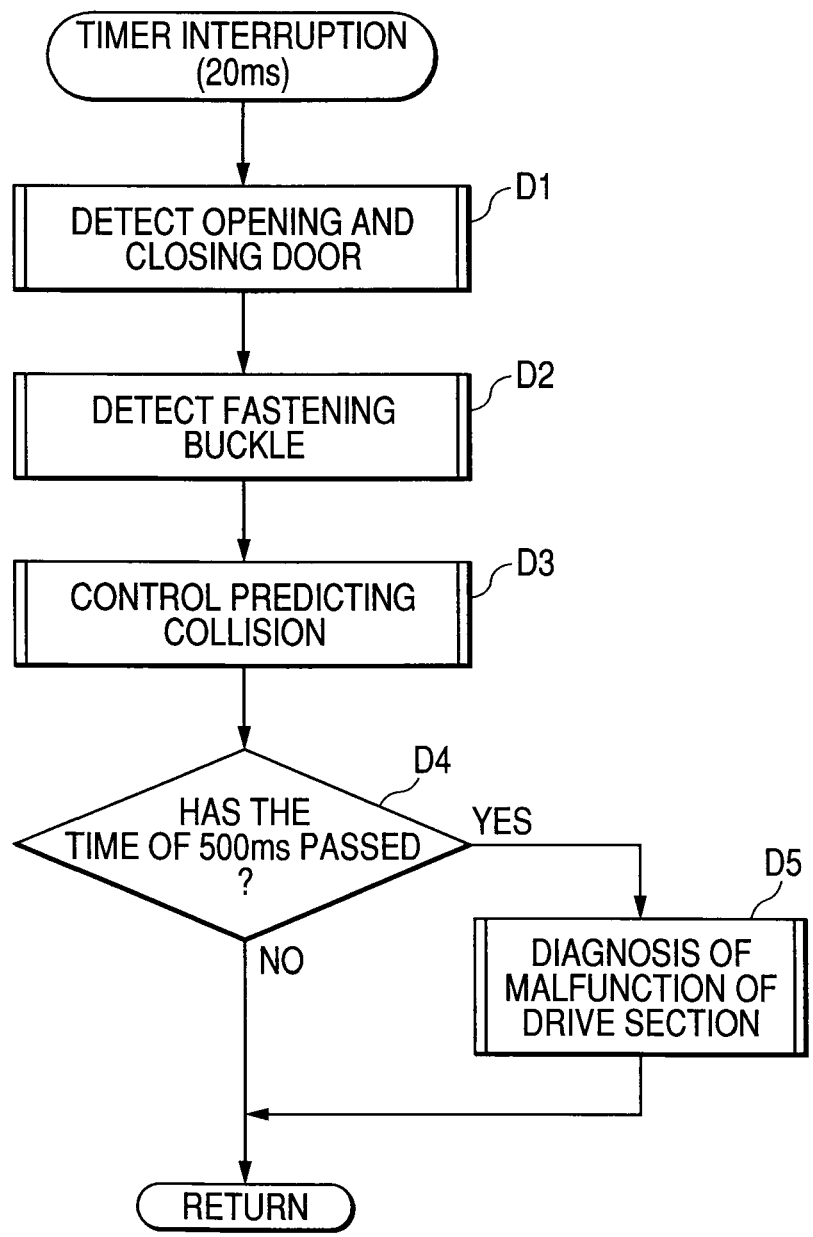
FIG. 9 is a flow chart for explaining an action of the micro-controller in the control system.
Figure 25:
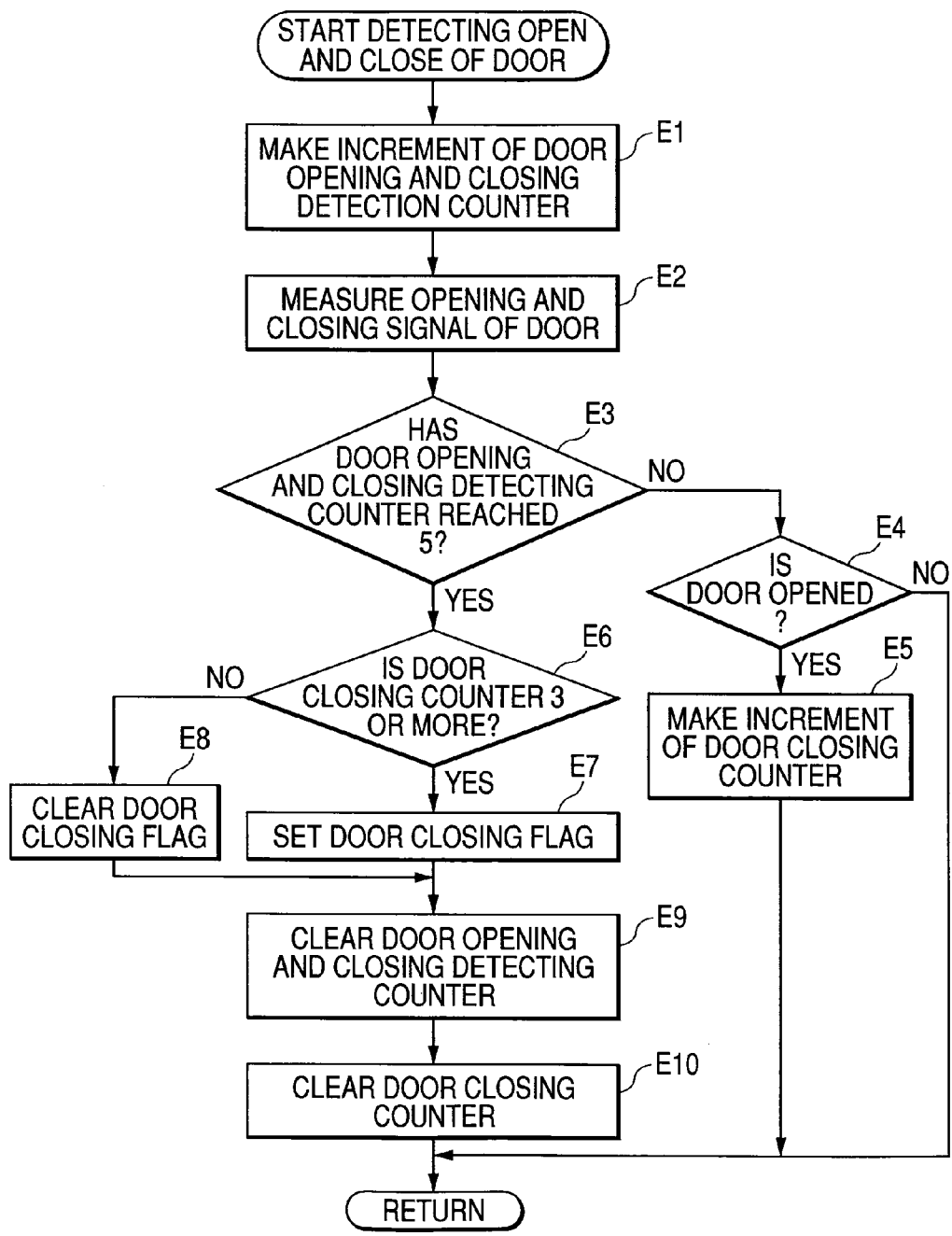
FIG. 25 is a flow chart for explaining an action of the micro-controller in the control system.

Next, the micro-controller (CPU) of the control system 14 allows a timer interruption (step A2). In this case, for example, the timer interruption is 20 ms, and the interruption is made for each 20 ms, and processing shown in FIG. 9 is conducted. First, the door opening and closing detection is made (step D1 in FIG. 9). In detail, the door opening and closing detection is made by the procedure shown in FIG. 25. In this case, the door opening and closing detection is made by the number of opening and closing operation detected by a door opening and closing detection counter not shown, and a predetermined flag is set. In FIG. 25, first of all, an increment of the door opening and closing detection counter is made (step E1). This counter is set at a predetermined position in RAM (register) and an increment of the door opening and closing detection counter is made each time the door opening and closing detection is conducted. Next, a door opening and closing signal sent from a door switch provided in a vehicle is measured (step E2). Next, it is judged whether or not the door opening and closing counter has reached, for example, "5" (step E3). In the case where the door opening and closing counter has not reached "5", the program proceeds to step E4, and by the thus measured door opening and closing signal, it is judged whether or not the door is closed. In the case where the door is closed, an increment is made in the door closing counter (step E5). The door closing counter is set at a predetermined position in RAM (resister). In the case where the door closing is not detected in step E5, an increment is not made in the door closing counter, and the program returns to step A2 shown in FIG. 7. On the other hand, in step E3, in the case where the door opening and closing detection counter has reached "5", the program proceeds to step E6, and it is judged whether or not the door closing counter is not less than "3". In the case where the door closing counter is "3" or more, the door closing flag is set (step E7). In the case where the door closing counter is not "3" or more, the door closing flag is cleared (step E8). After that, the door opening and closing detection counter is cleared (step E9). Next, the door closing counter is cleared (step E10), and the program returns to step A2 shown in FIG. 7.

Figure 11:
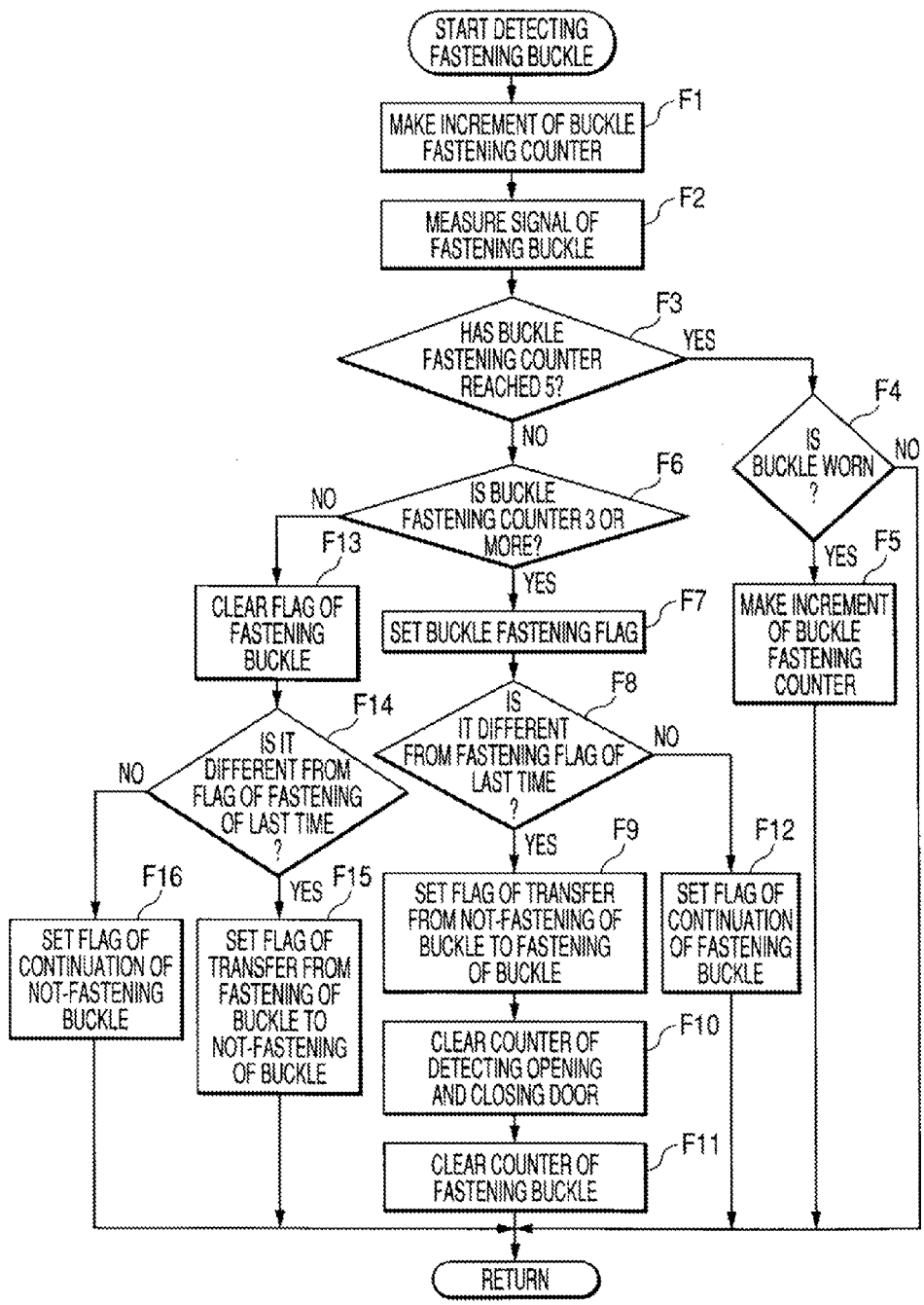
FIG. 11 is a flow chart for explaining an action of the micro-controller in the control system.

Next, by a signal sent from the seat belt fastening detecting system 16, the buckle fastening detecting routine (step D2 in FIG. 9) is executed. To be in detail, the buckle fastening detection is made by the action processing procedure shown in FIG. 11. In this case, when the buckle fastening counter counts the number of times of fastening and detecting of the buckle until the number of times increases to a predetermined value, it is detected whether or not the passenger fastens the buckle. When the result of detection of the last time and the result of detection of the present time are compared with each other, it is judged whether or not a change is made in fastening the buckle, and a predetermined flag is set. First, an increment is made in the buckle fastening counter arranged at a predetermined position in RAM (register) (step F1). Next, a buckle fastening signal is measured by the seat belt fastening detecting system 16 (step F2). Next, the micro-controller (CPU) of the control system 14 judges whether or not the buckle fastening counter has reached, for example, "5" (step F3). In the case where the buckle fastening counter has reached "5", the program proceeds to step F4, and it is judged by the measured buckle fastening signal whether or not the buckle is fastened by the passenger. In the case where the buckle is fastened by the passenger, an increment is made in the buckle fastening counter (step F5). After that, the program is returned. On the other hand, in the case where the buckle is not fastened in step F4, the program is returned as it is. In the case where the buckle fastening counter has not reached "5" in step F3, the program proceeds to step F6, and it is judged whether or not the buckle fastening counter is "3" or more. In the case where the buckle fastening counter is "3" or more, the buckle fastening flag is set (step F7). This flag is compared with the buckle fastening flag of the last time (step F8). In the case where this flag is different from the buckle fastening flag of the last time, the buckle fastening transfer flag is set from buckle not-fastening (step F9). After the door opening and closing detecting counter (step F10) and the buckle fastening counter (step F11) have been respectively cleared, the program is returned. On the other hand, in the case where the flag is the same as the buckle fastening flag of the last time as a result of the judgment made in step F8, the buckle fastening continuation flag is set (step F12). After that, the program is returned. Next, in the case where the buckle fastening counter is not "3" or more as a result of the judgment made in step F6, the buckle fastening flag is cleared (step F13), and the flag is compared with the buckle fastening flag of the last time (step F14). In the case where the flag is different from the buckle fastening flag of the last time as a result of the comparison, the buckle not-fastening transfer flag is set from buckle fastening (step F15). After that, the program is returned. In the case where the flag is the same as the buckle fastening flag of the last time as a result of the comparison made in step F14, the buckle not-fastening continuation flag is set (step F16). After that, the program is returned.

Figure 19:
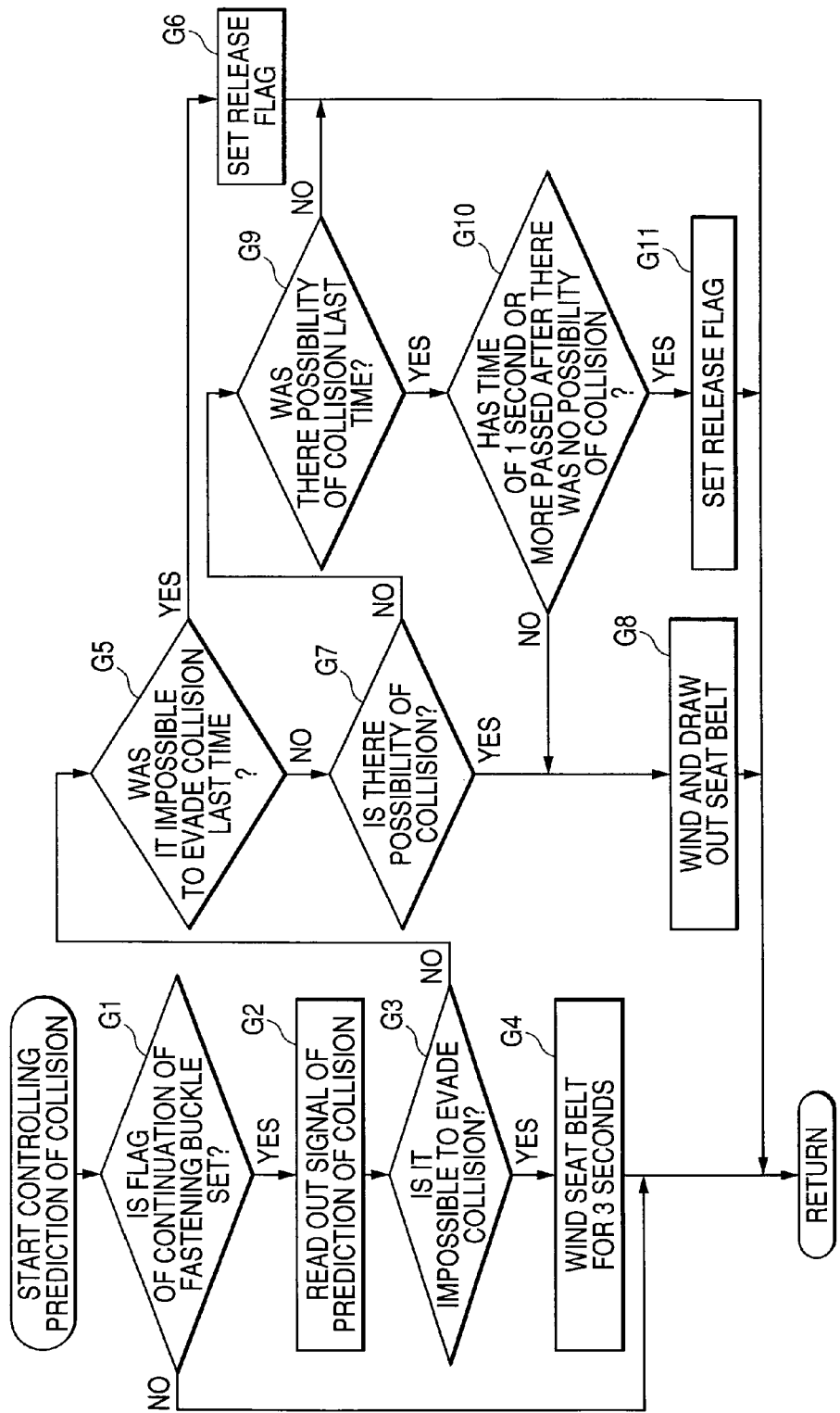
FIG. 19 is a flow chart for explaining an action of the micro-controller in the control system.

Next, the collision prediction control routine is executed (step D3 in FIG. 9). This routine is executed according to the processing procedure shown in FIG. 19. First, it is judged whether or not the buckle fastening continuation flag is set (step G1). In the case where the buckle fastening continuation flag is not set, the program is returned as it is. In the case where the buckle fastening continuation flag is set, a collision prediction signal is read out by the dangerous state detecting system 15 (step G2). According to this signal, it is judged whether it is impossible to evade the occurrence of collision or not (step G3). In this case, the clause "It is impossible to evade the occurrence of collision." means that it is impossible for a driver to avoid the occurrence of collision by his operation. In the case where the result of the judgment made in step G3 is "YES" in step G3, that is, in the case where it is judged that it is impossible to evade the occurrence of collision, the seat belt is driven being wound at high speed, for example, for three seconds (step G4). After that, the program is returned. This action is conducted being given priority over the other actions. In this connection, three seconds as the judgment time is just an example. That is, the judgment time is preferably set at the time needed for restricting a passenger when the passenger is in a state in which it is impossible to evade the occurrence of collision. On the other hand, in the case where the result of the judgment made in step G3 is "NO", that is, in the case where it is judged that it is possible to evade the occurrence of collision, the program proceeds to step G5 and it is judged whether or not it was impossible to evade the occurrence of collision at the last time. In this case, in the case where it is judged that it was impossible to evade the occurrence of collision, a release flag for returning the retractor, in which the webbing has been wound by the motor 5, to the initial state is set (step G6). After that, the program is returned. On the other hand, in the case where it was possible to evade the occurrence of collision at the last time as a result of the judgment made in step G5, it is judged whether or not there is a possibility of collision (step G7). In the case where it is judged that there is a possibility of collision, the driving of winding the seat belt and the driving of drawing out the seat belt are alternately conducted (step G8). Due to the foregoing, the passenger is informed of a danger. After that, the program is returned. On the other hand, in the case where it is not judged that there is a possibility of collision as a result of the judgment made in step G7, it is judged whether or not there was a possibility of collision at the last time (step G9). When it is judged that there was not a possibility of collision at the last time, the program is returned. On the other hand, when it is judged that there was a possibility of collision at the last time, it is judged whether or not one second or more has passed after the point of time when there was no possibility of collision (step G10). In the case where one second or more has not passed, the program proceeds to step G8, and successively the driving of winding the seat belt and the driving of drawing out the seat belt are alternately conducted. The reason why this operation is conducted is that although there was a possibility of collision only for a moment, the driving of winding the seat belt and the driving of drawing out the seat belt are alternately conducted for at least one second so as to securely give a warning of collision. In this case, one second of the judging time is just an example. That is, the time is preferably set so that it can be recognized as a warning. On the other hand, in the case where one second or more has passed from the point of time when there is no possibility of collision as a result of the judgment made in step G10, in order to return the retractor, which conducted winding by the motor 5, to the initial state, the release flag is set (step G11). After that, the program is returned.

After the completion of the collision prediction control routine (step D3), returning to FIG. 9, the program proceeds to step D4 and it is judged whether or not the time 500 ms has passed. A counter of 500 ms is set in RAM (register). Each time of timer interruption of 20 ms, an increment is made, and it is judged by this counted value whether or not it has reached 500 ms. When the counter of 500 ms has reached 500 ms, the drive system malfunction diagnosis routine is executed (step D5). After that, the counter of 500 ms is cleared, and the program is returned. On the other hand, in the case where the time 500 ms has not passed as a result of the judgment made in step D4, the drive system malfunction diagnosis routine is not executed, and the program is returned as it is.

Figure 18:
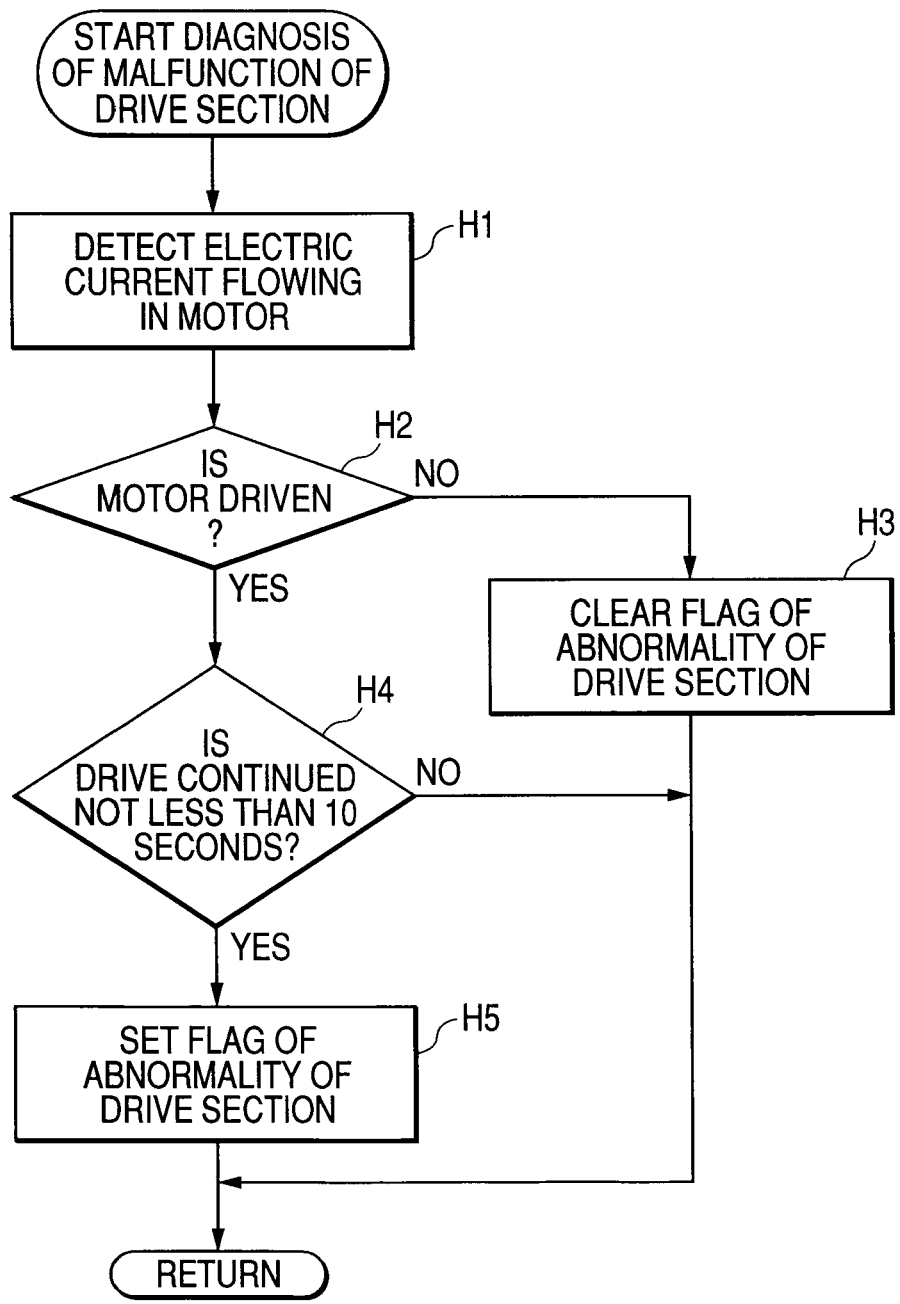
FIG. 18 is a flow chart for explaining an action of the micro-controller in the control system.

FIG. 18 is a diagram showing the drive system malfunction diagnosis routine. The drive system malfunction diagnosis is made by judging whether or not the motor driving is being continuously stopped for a predetermined period of time or more. First, an electric current flowing in the motor 5 is detected by an electric current detecting system not shown (step H1). When an intensity of this electric current is not less than a predetermined value, it is judged that the motor is being driven. When it is judged whether or not the motor is driven (step H2) and it is judged that the motor is not driven, a drive system abnormality flag, which is set in RAM (register), is cleared (step H3). After that, the program is returned. On the other hand, in step H2, in the case where it is judged that the motor is driven, the program proceeds to step H4, and it is judged whether or not the motor has been continuously driven for 10 seconds or more. In the case where the motor has been continuously driven for 10 seconds or more, the drive system abnormality flag is set (step H5). After that, the program is returned. On the other hand, in the case where the motor has not been continuously driven for 10 seconds or more, the program is returned as it is. In this case, the time of 10 seconds is an example. To sum up, it is preferable that the time is set at a value not less than the maximum continuation time of driving which is conducted in a usual motor driving operation.

Next, a state of the buckle 304 is judged according to the result of processing the buckle fastening detecting routine (step D2) conducted for each timer interruption (step A2) described before (step A3). According to the result of the judgment, each control of the prior fastening control (step A6), the initial fastening control at the initial state of fastening, the control conducted during fastening or the control of accommodation is executed.

In the buckle fastening detection, according to the setting state of each flag showing a state of the buckle 304, the state of the buckle 304 can be detected (step A3).

Figure 10:
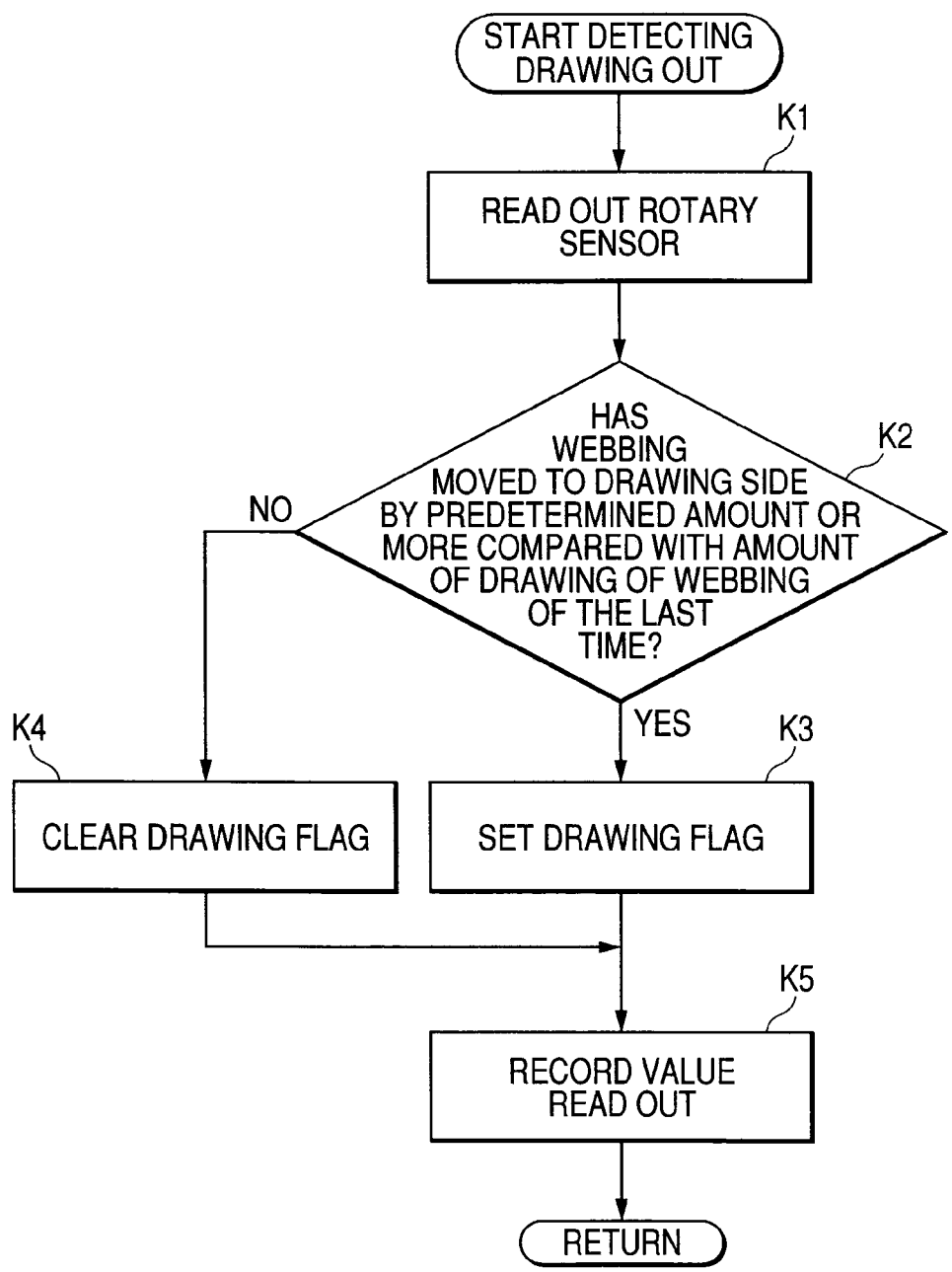
FIG. 10 is a flow chart for explaining an action of the micro-controller in the control system.
Figure 12:
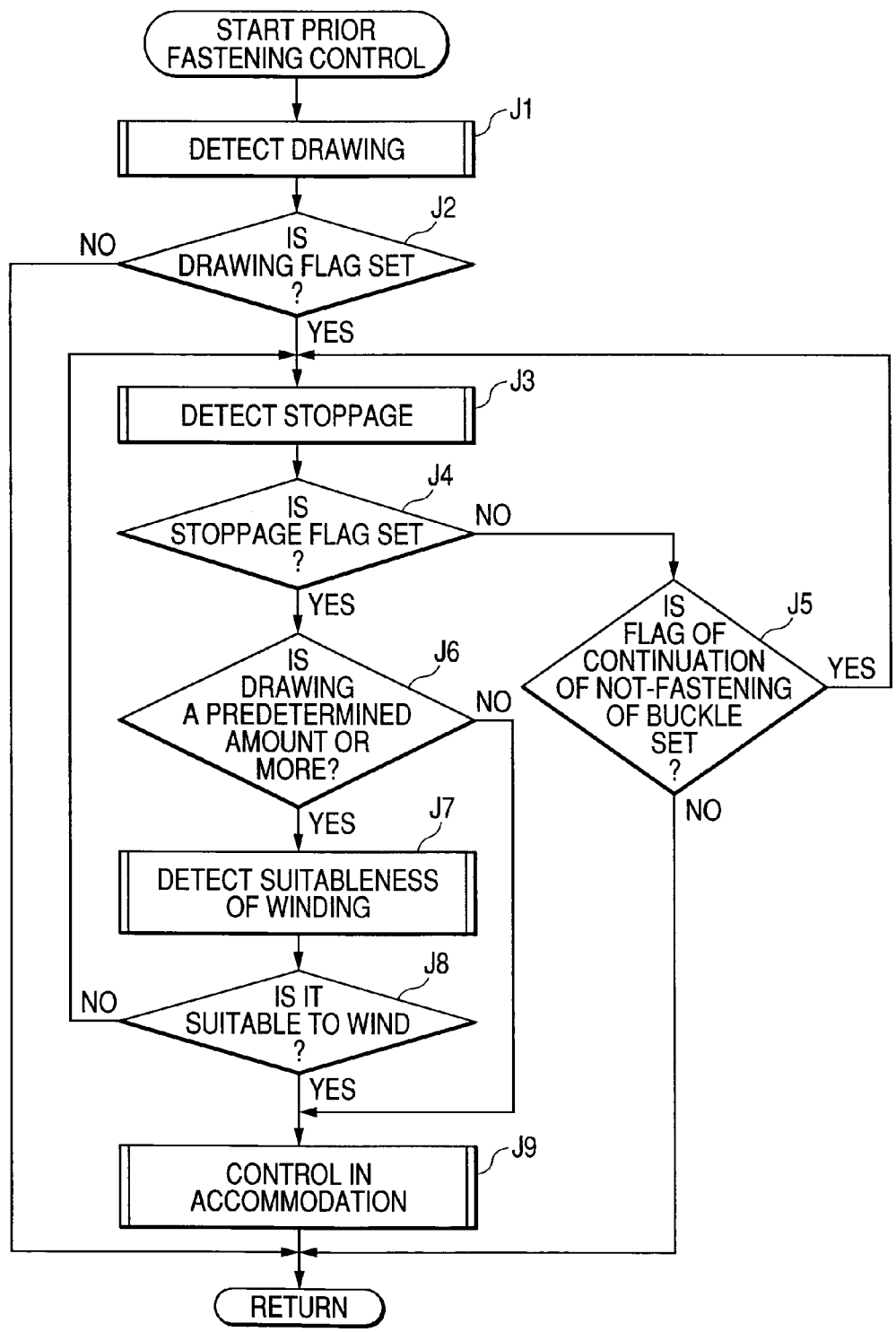
FIG. 12 is a flow chart for explaining an action of the micro-controller in the control system.
Figure 17:
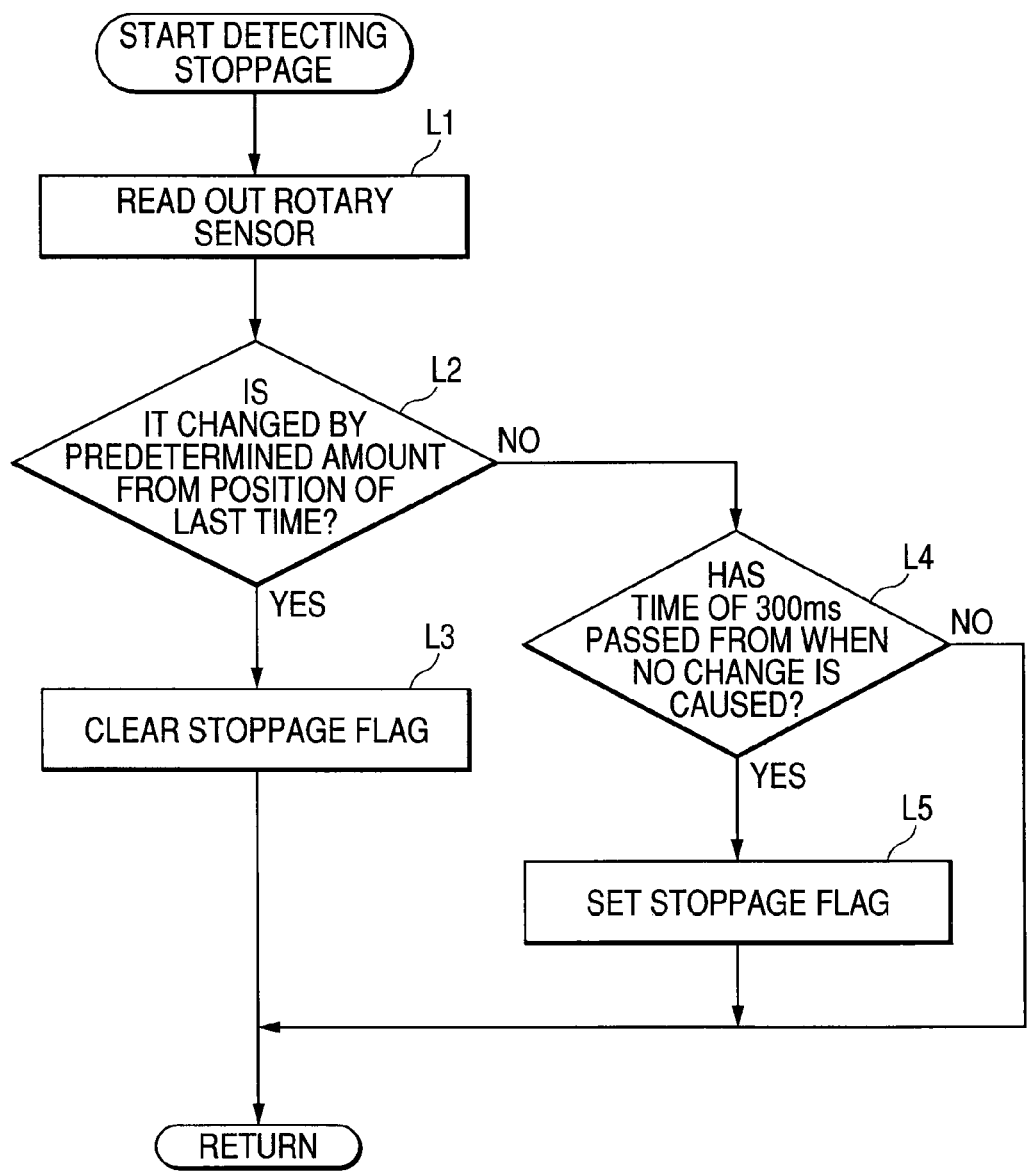
FIG. 17 is a flow chart for explaining an action of the micro-controller in the control system.

When it is judged that a state of not-fastening the buckle is continued (step A4), the corresponding flag is cleared (step A5). After that, the control conducted before fastening, the detail of which is shown on FIG. 12, is conducted (step A6). First, the drawing detection is conducted in which whether or not the webbing 302 is drawing out is detected (step J1). This drawing detection is executed according to the processing procedure, the detail of which is shown in FIG. 10. First, an amount of rotation of the spindle 2 is read out by a rotary sensor to detect a rotation of the spindle 2 (step K1). Next, it is judged whether or not a value, which has been read out, is moved to the drawing side by a predetermined amount with respect to the value which was read out at the last time (step K2). In this case, when it is judged that the value has been moved to the drawing side by a predetermined amount or more, it is judged that the drawing is conducted, and the drawing flag is set (step K3). On the other hand, in the case where it is judged in step K2 that the value has not been moved by the predetermined amount or more, the drawing flag is cleared (step K4). Next, an amount of reading the rotary sensor is recorded at a predetermined position in RAM (step K5). After that, returning to the processing shown in FIG. 10, it is judged whether or not the drawing flag is set (step J2). In the case where the drawing flag is not set, the prior fastening control (step A6) is returned. On the other hand, in the case where the drawing flag is set as a result of the judgment made in step J2, the program proceeds to step J3, and the stop detecting routine, the detail of which is shown in FIG. 17, is executed. In this case, a stoppage of the webbing 302 (a state in which the webbing 302 is neither drawn nor wound) is detected. First, an output of the rotary sensor for detecting an amount of rotation of the spindle 2 is read out (step L1 shown in FIG. 17). Next, an amount of rotation which has been read out, and an amount of rotation which is read out at the last time, are compared with each other, and it is judged whether or not a predetermined amount of change is caused (step L2). In the case where the amount of rotation of the last time and the amount of rotation of the present time are different from each other as a result of this judgment, it is judged that the webbing 302 is not stopped, and the stoppage flag is cleared (step L3) and the corresponding stoppage detecting routine is ended. On the other hand, in the case where there is no difference between the amount of rotation of the last time and the amount of rotation of the present time as a result of the judgment made in step L2, the program proceeds to step L4, and it is judged whether or not the time 300 ms or more has passed after the time when no change is caused in the amount of rotation. When the time 300 ms has passed as a result of this judgment, it is judged that the webbing 302 is stopped, and the stoppage flag is set (step L5). After that, the program is returned. On the other hand, when it is judged that the time 300 ms has not passed in step L5, the program is returned as it is.

When the stoppage detecting routine (step J3 in FIG. 12) is completed, the program is transferred to step J4 and it is judged whether or not the stoppage flag is set. In the case where the stoppage flag is not set as a result of this judgment, the program is transferred to step J5 and it is judged whether or not the buckle not-fastening continuation flag is set (step J5). In the case where the buckle not-fastening continuation flag is set, the stoppage detecting routine of step J3 is executed. On the other hand, in the case where it is judged in step J5 that the buckle not-fastening continuation flag is not set, the program is returned as it is. On the other hand, in the case where it is judged that the stoppage flag is set as a result of the judgment made in step J4, it is judged whether or not the webbing is drawn out by a predetermined amount or more (step J6). In this case, it is preferable that a predetermined amount of drawing of the webbing is set to be smaller than an amount of drawing of the webbing necessary for restricting a passenger seated in the seat. The reason is described as follows. A winding spring incorporated into this embodiment is set in such a manner that its spring force is the same as a force substantially capable of restricting the passenger seated in the seat, so that an oppressive sensation caused by fastening the seat belt can be reduced to be lower than that of a usual seat belt. Therefore, when the tongue is disengaged from the buckle 304, it is impossible to completely accommodate the webbing 302 only by the winding spring. Therefore, this predetermined amount determines whether or not it is an amount of drawing in which the webbing 302 can be accommodated only by the winding spring. In the case where the amount of drawing of the webbing 302 is not a predetermined amount or more, it is judged that the webbing 302 can not be wound only by the winding spring and the program jumps to the accommodation control routine in step J9. On the other hand, when it is judged that the webbing 302 has been drawn out by the predetermined amount or more as a result of the judgment of step J6, the program is transferred to the winding suitableness detecting routine of step J7.

Figure 23:
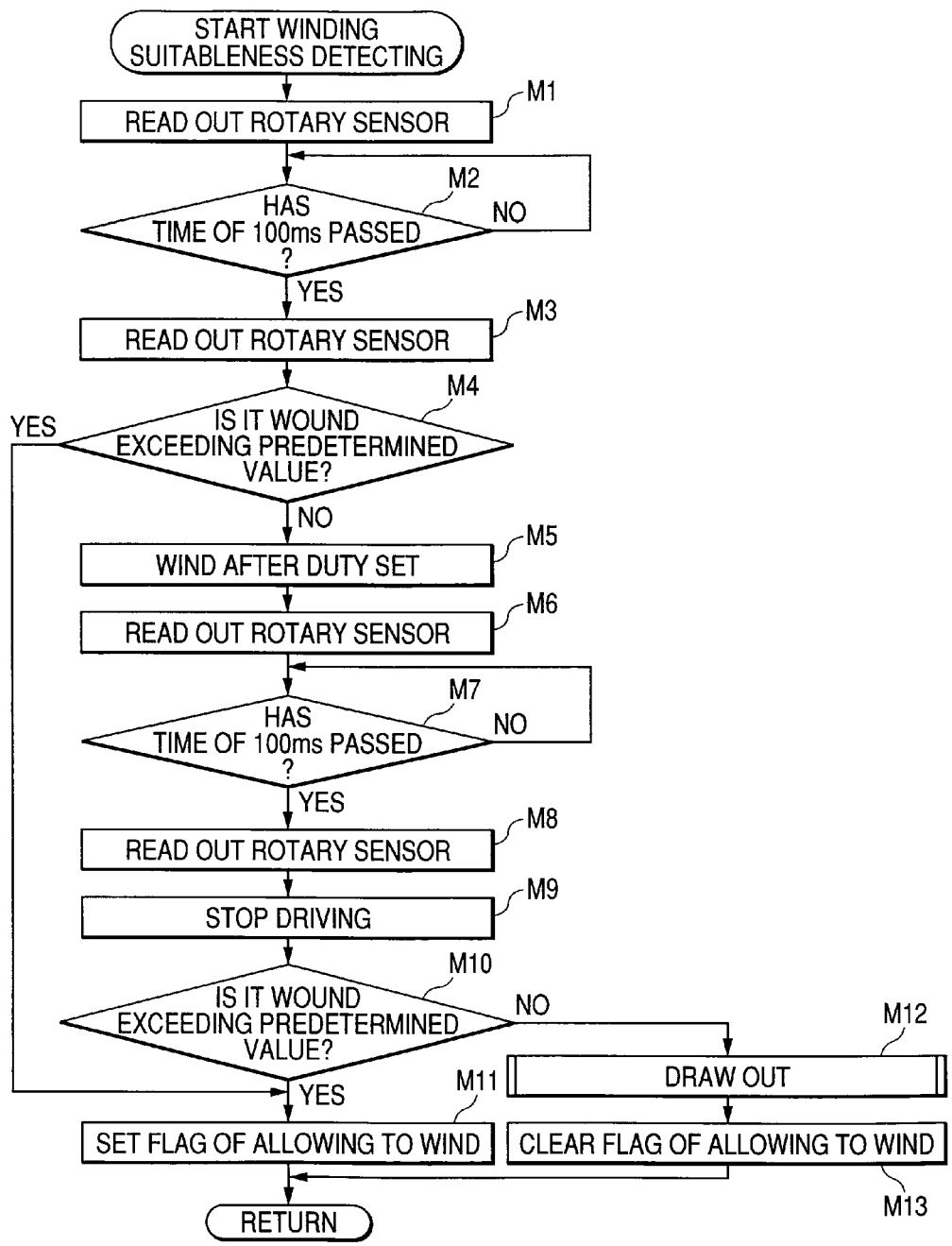
FIG. 23 is a flow chart for explaining an action of the micro-controller in the control system.

The detail of the winding suitableness detecting routine (step J7) is shown in FIG. 23. First, it is judged whether or not the webbing 302 can be wound by the winding spring. In the case where it is judged that the webbing 302 can not be wound by the winding spring, it is judged whether or not the webbing 302 can be wound by a predetermined winding force generated by the motor 5. First, an amount of rotation of the spindle 2 measured by the rotary sensor in 100 ms is read out (steps M1, M2, M3), and it is judged whether or not the webbing 302 is wound by an amount of not less than a predetermined value in 100 ms (step M4). When it is judged that the webbing 302 is wound by an amount not less than a predetermined value according to the result of the judgment made in step M4, the micro-controller (CPU) of the control system 14 sets a winding flag (step M11), and the winding suitableness detecting routine shown in FIG. 23 is ended. On the other hand, when it is not judged that the webbing 302 is wound by an amount not less than a predetermined value according to the result of the judgment made in step M4, the program is transferred to a winding suitableness detection in which the motor 5 is used for winding. First, in order to set a winding force generated by the motor 5, the duty ratio of PWM signal given to the motor 5 is set, and then the winding driving signal is turned on (step M5). After that, an amount of rotation of the spindle 2 in 100 ms is read out by the rotary sensor and the motor 5 is stopped (steps M6, M7, M8 and M9). Next, the micro-controller (CPU) of the control system 14 proceeds to step M10 and it is judged whether or not the webbing 302 is wound by an amount not less than a predetermined value. When it is judged that the webbing 302 is wound by the amount not less than the predetermined value, the winding flag is set and the program is returned. On the other hand, when it is judged that the webbing 302 is not wound by the amount not less than the predetermined value according to the result of the judgment made in step M10, as described before, the drawing drive, the detail of which is shown in FIG. 20, is conducted (step M12) and the clutch 11 is released and the winding flag is cleared (step M13). Then, the program is returned.

After the completion of the winding suitableness detection (after the completion of the processing routine shown in FIG. 23), returning to FIG. 12, the program proceeds to step J8, and the suitableness of winding is judged according to whether or not the winding flag is set. In the case where it is impossible to conduct winding, the program returns to the stoppage detection routine shown in step J3. On the other hand, in the case where it is possible to conduct winding, the program proceeds to step J9 and the accommodation control is conducted.

Figure 15:
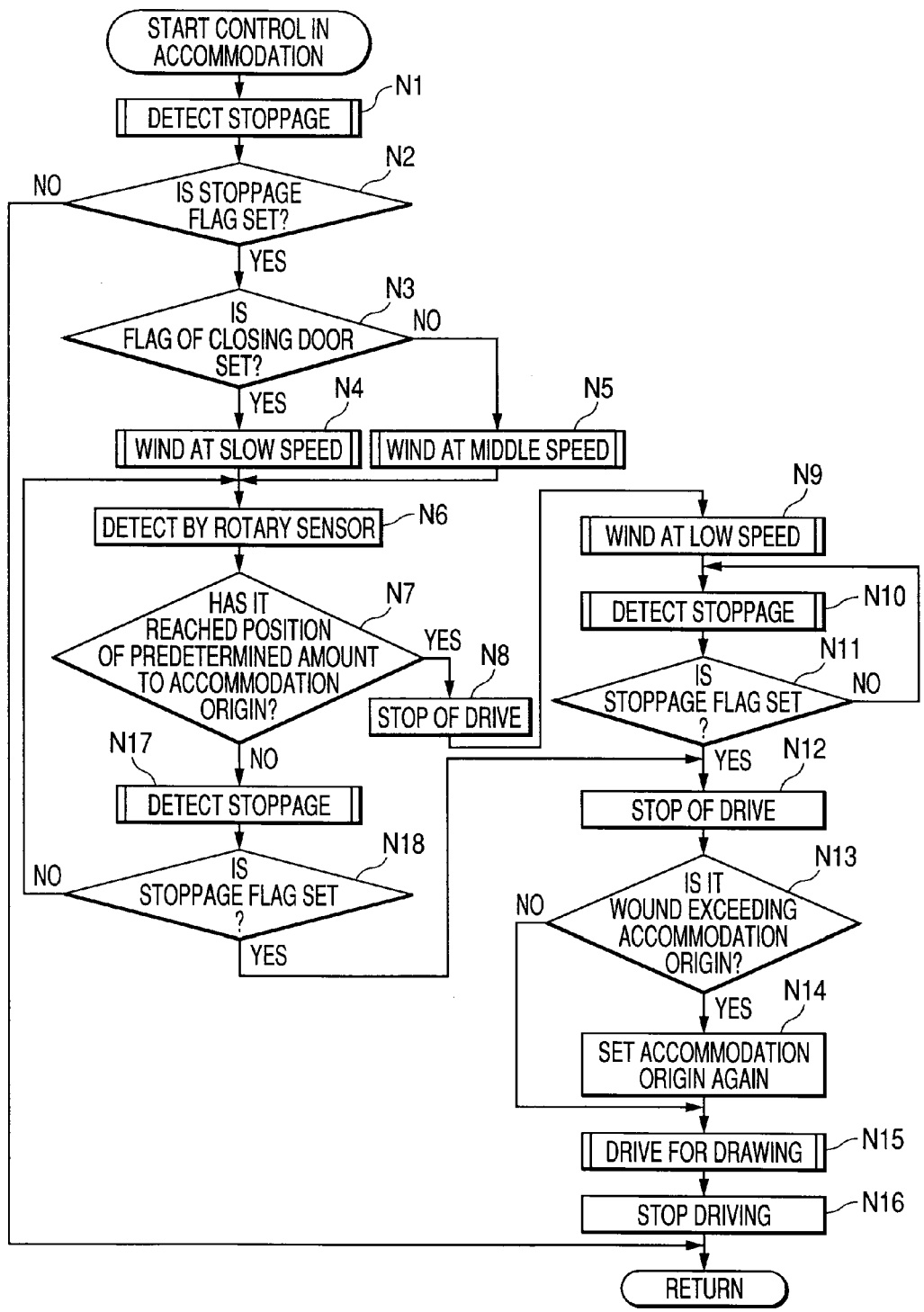
FIG. 15 is a flow chart for explaining an action of the micro-controller in the control system.

Next, referring to FIG. 15, the accommodation control (step J9) will be explained in detail. First, a stoppage of the webbing 302 is detected (step N1) by the stoppage detection described above (the routine (steps L1-L5) in FIG. 17), and it is judged whether or not the stoppage flag is set (step N2). When the stoppage flag is not set as a result of this judgment, the corresponding accommodating control routine is returned as it is. On contrary, when the stoppage flag is set as a result of the judgment in step N2, it is judged whether or not the door closing flag is set (step N3). When the door closing flag is set as a result of this judgment, winding is conducted at low speed (step N4). On the other hand, when the door closing flag is not set as a result of this judgment, winding is conducted at middle speed (step N5). The reason why this operation is conducted is described below. In order to prevent the webbing 302 from being pinched by the door, when the door is opened, the operation is conducted so that the webbing 302, which has not been completely accommodated yet at the point of time when the door is closed, can be prevented from being pinched by the door when the door is closed.

Figure 21:
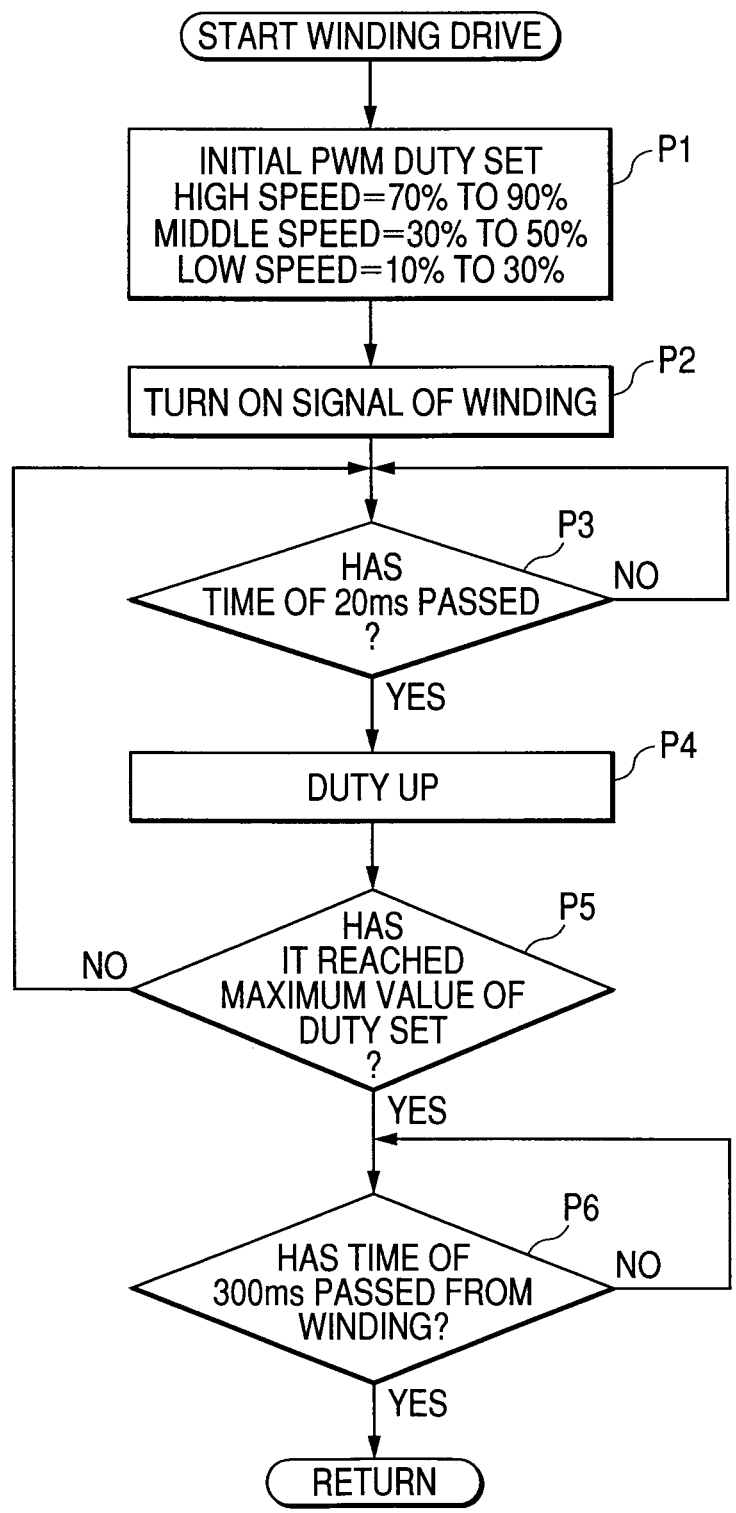
FIG. 21 is a flow chart for explaining an action of the micro-controller in the control system.

In this case, in steps N4 and N5, the webbing 302 is wound according to the winding routine shown in FIG. 21. First, according to the winding speed to be set, the duty ratio of PWM is set (step P1). For example, in the case of winding conducted at high speed, a specific value of 70% to 90% is initially set as the initial duty ratio of PWM. In the case of winding conducted at middle speed, a specific value of 30% to 50% is initially set as the initial duty ratio of PWM. In the case of winding conducted at low speed, a specific value of 10% to 30% is initially set as the initial duty ratio of PWM. Next, the winding drive signal is turned on, and winding is executed by the motor 5 (step P2). The duty ratio is increased by a predetermined amount for each 20 ms (step P3), that is, the duty ratio is gradually increased (step P4). In other words, the winding force is gradually increased. Next, it is judged whether or not the duty ratio has reached the maximum value which is set for each winding speed (step P5). When the duty ratio has not reached the maximum value, the duty ratio is successively increased (step P3, P4, P5). When the duty ratio has reached the maximum value, the program is transferred to the next step P6. In step P6, it is judged whether or not the time of 300 ms has passed from the start of winding. In the case where the time 300 ms has passed, the program is returned. In the case where the time 300 ms has not passed, the program is not returned until the time 300 ms passes. In this case, the lapse of time 300 ms is just an example. The lapse of time 300 ms is used for setting the continuation time of winding. Therefore, it is preferable that the webbing can be positively wound in this lapse of time 300 ms.

After the completion of winding (after the completion of the processing routine shown in FIG. 21), returning to FIG. 15, the program proceeds to step N6. According to the reading of the rotary sensor, an amount of rotation of the spindle 2 is detected. From the accommodation origin, which has already been set, and the detected amount of rotation of the spindle 2, it is judged whether or not the webbing 302 has reached a predetermined position from the accommodation origin (step N7). When it is judged that the webbing 302 has reached the predetermined position, the driving is stopped so as to stop winding the webbing (step N8). In this case, it is preferable that the predetermined position is determined at a position where the webbing can not be pinched by the door when the webbing is drawn out from the accommodation origin. This action is conducted for an object of preventing the occurrence of the following problems. In the way of winding the webbing to be accommodated, the tongue is moved together with the webbing 302 and collides with an interior member at a certain speed and the interior member is damaged. In order to prevent the collision of the tongue, winding of the webbing is once stopped at a certain position. However, the following problems may be also encountered. At the point of time when winding of the webbing is just stopped, the tongue and the webbing 302 are left outside the vehicle. Therefore, when the door is closed in this state, the webbing 302 is pinched by the door. In this case, there is a possibility that the webbing 302 is damaged, which is not preferable from the viewpoint of ensuring the mechanical strength of the webbing. In order to prevent the occurrence of the above problems, it is preferable that the predetermined position where the webbing 302 is once stopped is set at a position where at least the webbing 302 is not pinched by the door.

After the stoppage of driving in step N8, the program proceeds to step N9, and the winding (low speed) routine (steps P1 to P6) shown in FIG. 21 is executed. Next, the program proceeds to step N10 and the stoppage detection (steps L1 to L5) shown in FIG. 17 is conducted. After that, it is judged whether or not the stoppage flag is set (step N11). When the stoppage flag is not set as a result of this judgment, the program returns to the stoppage detection of step N10. On the other hand, when the stoppage flag is set, driving is stopped (step N12).

On the other hand, when it is judged that the webbing 302 has not reached a predetermined position from the accommodation origin as a result of the judgment made in step N7, the program proceeds to step N17, and the stoppage detection (steps L1 to L5) shown in FIG. 17 is conducted. After that, it is judged whether or not the stoppage flag is set (step N18). When the stoppage flag is not set as a result of this judgment, the program returns to step N6. According to the reading of the rotary sensor, an amount of rotation of the spindle 2 is detected again. On the other hand, when the stoppage flag is set, driving is stopped (step N12).

Next, a comparison is made between the accommodation origin, which has already been set, and the amount of rotation of the spindle which has been read out by the rotary sensor, and it is judged whether or not driving is further conducted from the accommodation origin (step N13). When it is judged that winding is further conducted, setting is conducted again in such a manner that an amount of rotation of the spindle detected by the rotary sensor at the position is set as the accommodation origin (step N14). On the other hand, in the case where it is judged that winding is not conducted exceeding the accommodation origin, the accommodation origin is not newly set. When processing of step N14 is completed, the program proceeds to step N15 and the drawing drive routine shown in FIG. 20 is executed and completed. Then, returning to FIG. 15, the program returns to step N16 and the clutch 11 is released and driving is stopped.

The program returns to step A3 shown in FIG. 7. When it is judged that a flag, which shows a change from a state where the buckle 304 is not fastened to a state where the buckle 304 is fastened in the state flags of the buckle 304, is set (step A7), the corresponding flag is cleared (step A8). After that, the initial fastening control is conducted (step A9).

Figure 13:
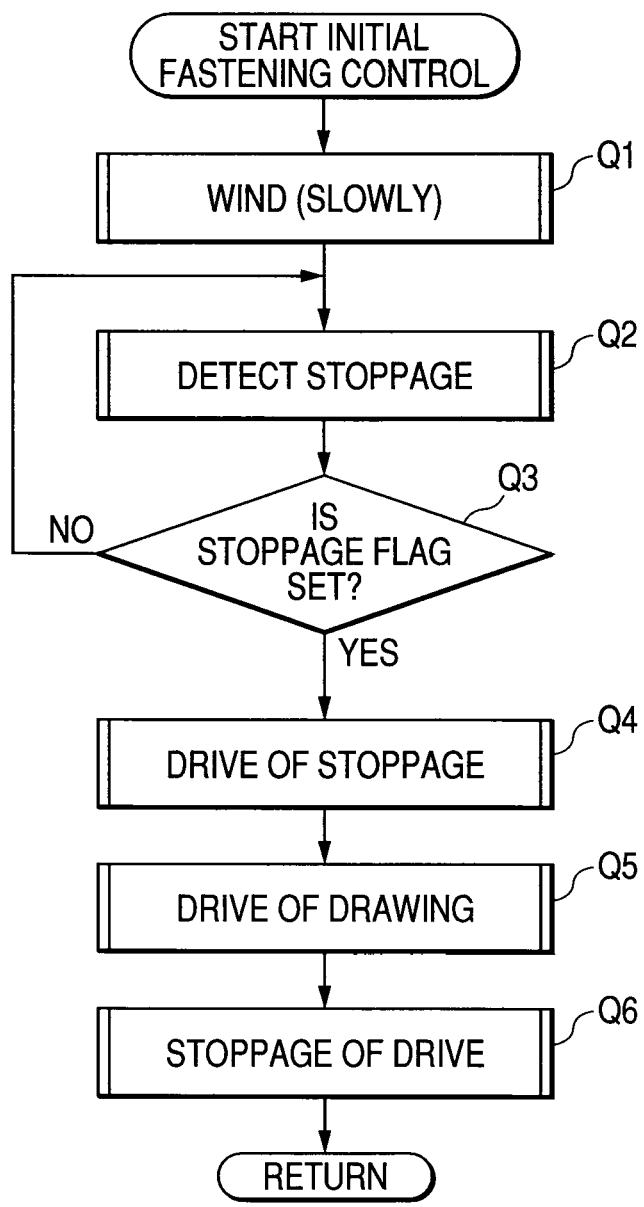
FIG. 13 is a flow chart for explaining an action of the micro-controller in the control system.

The initial fastening control of step A9 is shown in detail in FIG. 13 (steps Q1 to Q6). First, winding is conducted (step Q1). This winding is basically the same as the winding shown in FIG. 21 described before. However, the following points are different. PWM duty ratio is changed from 10% to 30%. A period of increasing the duty ratio is not 20 ms but 100 ms. A continuation time of winding is not 300 ms but, for example, 2 s. These values are just an example. It is preferable that PWM duty ratio is a value capable of generating a winding force by which looseness of the webbing 302 can be properly removed. It is preferable that the period of increasing the duty ratio is a sufficiently long period for slowly changing an intensity of the winding force so as to prevent the generation of a sense of incongruity which is generated when a sudden change is given to the winding force. It is preferable that the winding continuation time is a continuation time in which an amount of looseness can be sufficiently wound when winding is slowly conducted.

Returning to FIG. 13, after the completion of winding (step Q1), the program proceeds to step Q2 and the stoppage detection (steps L1 to L5) shown in FIG. 17 is conducted. Next, it is judged whether or not the stoppage flag is set (step Q3). When the stoppage flag is set as a result of the judgment, the stoppage drive is conducted (step Q4). On the other hand, when the stoppage flag is not set, the program returns to the stoppage detection (step Q2).

Figure 22:
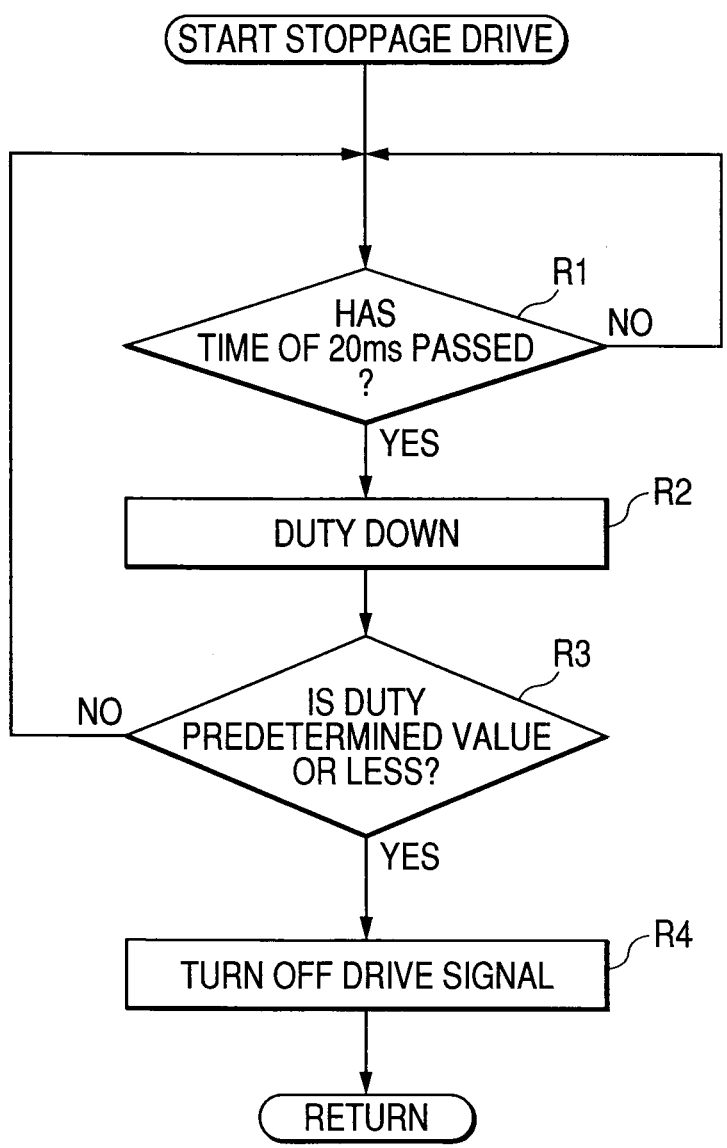
FIG. 22 is a flow chart for explaining an action of the micro-controller in the control system.

The stoppage driving is shown in detail in FIG. 22. PWM duty ratio of driving the motor 5 is subjected to duty-down for each 20 ms (steps R1, R2), and the processing of steps R1 and R2 is continued until the duty ratio becomes a predetermined value (step R3). When the duty ratio becomes a value not more than the predetermined value, the motor drive signal is turned off (step R4), and the program is returned. In this case, each value is just an example. It is preferable that each value is set at a value by which the spindle rotating in a winding direction can be slowly stopped so that the spindle 2 rotating in the winding direction can not be locked by the action of WSI. The reason why the spindle rotating in the winding direction is slowly stopped is that a bungle of WSI, which is a portion of the main lock, is prevented. WSI is the well known prior art and is structured in such a manner that when the webbing 302 is drawn out at an acceleration not less than a predetermined value, the spindle 2 is locked so as to prevent the webbing 302 being drawn out.

Returning to FIG. 13, after winding is stopped (step Q4), the program proceeds to step Q5. In order to release the clutch 11, the drawing drive (steps S1 to S6) in FIG. 20 described before is conducted. After that, the stoppage drive is conducted (step Q6).

Returning to step A3 shown in FIG. 7, when it is judged that the buckle fastening continuation flag, which is in the flags showing a state of the buckle 304, is set (step A10), the corresponding flag is cleared (step A11). After that, the fastening control is conducted (step A12).

Figure 14A:
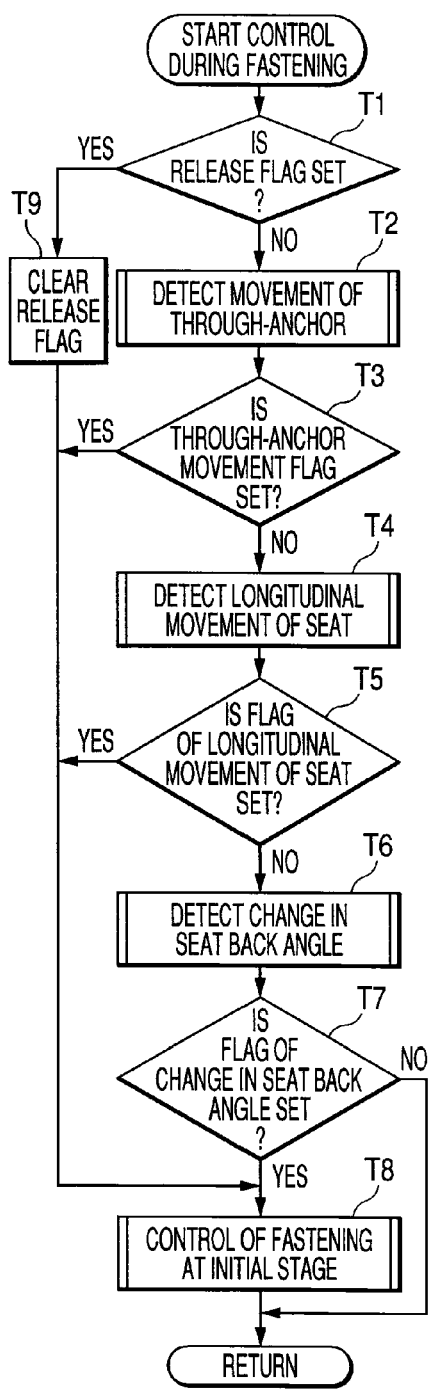
FIGS. 14(a) to (d) are flow charts for explaining an action of the micro-controller in the control system.
Figure 14B:
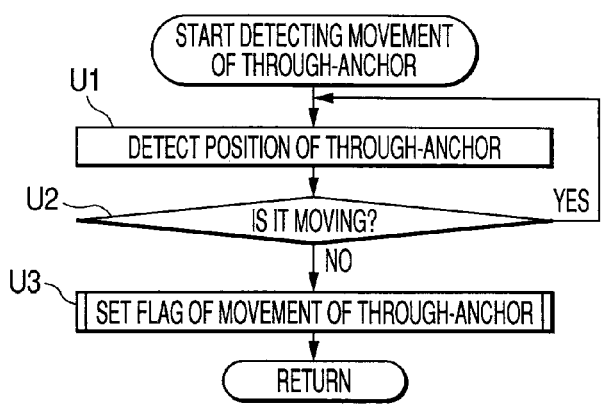
Figure 14C:
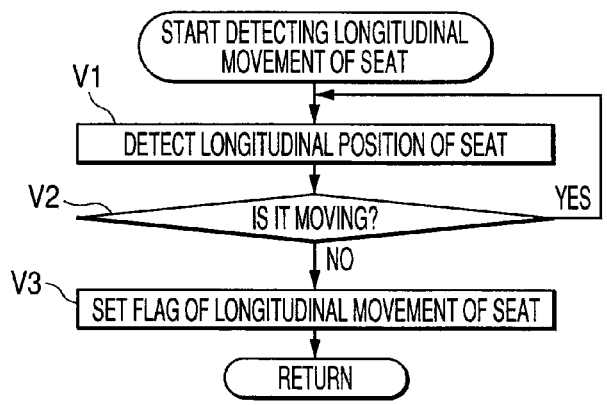

The control of fastening is described in detail in FIG. 14(a). First, the micro-controller (CPU) of the control system 14 checks whether or not the release flag is set (step T1). When the release flag is set, the release flag is cleared (step T9) and then the program jumps to step T8 and the initial fastening control is executed. After that, the program is returned. On the other hand, when the release flag is not set as a result of checking the release flag in step T1, a through-anchor moving detection is conducted (step T2). As shown in FIG. 14(b), the action processing procedure of the through-anchor moving detection is described as follows. First, a movement of the shoulder portion in the vertical direction of the vehicle is detected by a sliding type potentiometer and the output is read and detected by the control system 14 (step U1). This detection is made by a timer interruption at each predetermined time. Next, a comparison is made between the through-anchor position at the timer interruption of the last time and the through-anchor position at the timer interruption of the present time, and it is judged whether or not the through-anchor is moving (step U2). When it is judged that the through-anchor is moving, the program is returned to the through-anchor position detection (step U1). On the other hand, when it is judged that the through-anchor is stopped, the through-anchor moving flag is set (step U3), and then the program is returned to the processing routine shown in FIG. 14(a). In step T3, it is judged whether or not the through-anchor moving flag is set. When the through-anchor moving flag is set, the program jumps to step T8 and the initial fastening control is executed. After that, the program is returned. On the other hand, when it is judged that the through-anchor moving flag is not set in step T3, the seat longitudinal moving detection is conducted according to the routine shown in FIG. 14(c) (steps V1, V2). This detection is made by the same method as that of the aforementioned through-anchor moving detection. In the case where the seat is moved (when it is "NO" in step V2), after the seat movement is detected, the seat longitudinal movement flag is set (step V3), and the program is returned to the processing routine shown in FIG. 14(a). In step T5, it is judged whether or not the seat longitudinal movement flag is set. When it is judged that the corresponding flag is set, the initial fastening control is executed and the program is returned.

Figure 14D:
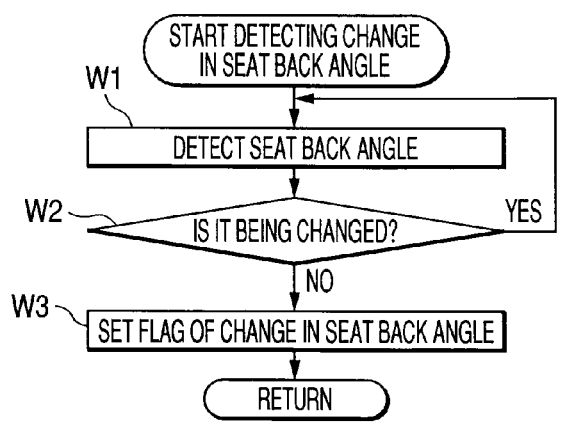

On the other hand, when it is judged that the seat longitudinal movement flag is not set in step T5, by the processing procedure shown in FIG. 14(d), a seat back angle change detection is made. The seat back angle change detection is made as follows. An angle between the seat face and the seat back is detected by a potentiometer for detecting the angle (step W1), and a signal corresponding to the angle is outputted to the control system 14. The control system 14 reads out the output for each predetermined timer interruption and judges whether or not there is a difference between the angle of the timer interruption of the last time and the angle of the timer interruption of the present time. In this way, it is judged whether or not the angle is being changed (step W2). When the change has been stopped, a seat back angle change flag is set (step W3), and the program is returned to the processing routine shown in FIG. 14(a). In step T7, it is judged whether or not the seat back angle change flag is set. When it is judged that the corresponding flag is set, the initial fastening control is executed, and the program is returned. On the other hand, in step T7, when it is judged that the seat back angle change flag is not set, the program is returned as it is.

The above series of actions are executed so that a redundant looseness can not be given to the webbing 302.

Returning to step A3 shown in FIG. 7, when the buckle state is judged by a flag which is related to a change from the buckle fastening to the buckle not-fastening (step A13), the corresponding flag is cleared (step A14). After that, the accommodation control shown in FIG. 15 is conducted (step A15).

Figure 16B:
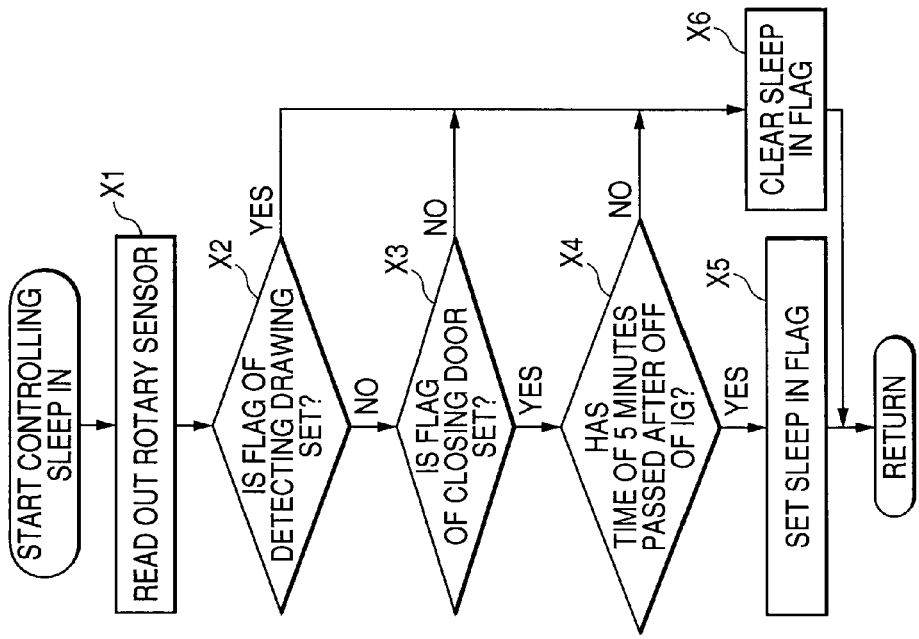
FIG. 16B is a flow chart for explaining an action of the micro-controller in the control system.
Figure 16A:
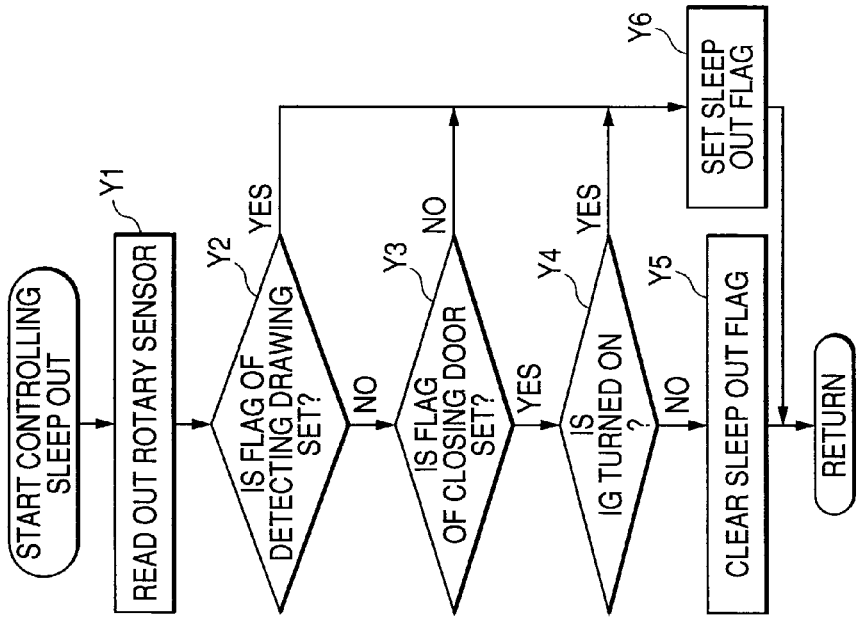
FIG. 16A is a flow chart for explaining an action of the micro-controller in the control system.

Returning again to the routine shown in FIG. 7, the sleep IN control routine is executed in step A16. As the detail of the sleep IN control routine is shown in FIG. 16(a), in the sleep IN control routine, operation is conducted as follows. First, by the rotary sensor, an amount of rotation is read out (step X1). From the thus read amount of rotation, the micro-controller (CPU) of the control system 14 judges whether or not the webbing 302 is drawn out (step X2). When the drawing of the webbing 302 is detected, the program jumps to step X6, and the sleep IN flag is cleared and the program is returned. On the other hand, when the drawing of the webbing 302 is not detected in step X2, it is judged whether or not the door of the objective seat belt is closed (step X3). When the corresponding door is not closed, the sleep IN flag is cleared (step X6), and the program is returned. Meanwhile, when it is detected in step X3 that the door of the objective seat belt is closed, it is judged whether or not a period of time not less than 5 minutes has passed after OFF of the ignition switch (IG) (step X4). When the period of time not less than 5 minutes has not passed, the program proceeds to step X6, and the sleep IN flag is cleared. After that, the program is returned. On the other hand, when the period of time not less than 5 minutes has passed, the program proceeds to step X5 and the sleep IN flag is set. After that, the program is returned.

That is, when the webbing 302 is not drawn out and the objective door is closed and a period of time not less than 5 minutes has passed after OFF of the ignition switch (IG), the sleep IN flag is set (step X5). Except for that, the sleep IN flag is cleared (step X6).

After the completion of the sleep IN control shown in FIG. 16(a), the program is returned to FIG. 7. In step A17, it is judged whether or not the sleep IN flag is set. When the sleep IN flag is set, the program is transferred to a sleep mode (step A18). The reason why the program is transferred to the sleep mode is that only preparations necessary for returning from a state of sleeping are made so as to reduce an electric current consumed in the device.

Next, the program proceeds to step A19 and the sleep OUT judgment is made. The detail of the processing of this sleep OUT control is shown in FIG. 16(b). First, the micro-controller (CPU) of the control system 14 reads out an amount of rotation by the rotary sensor (step Y1). By the thus read amount of rotation, it is judged whether or not the webbing 302 has been drawn out (step Y2). When the drawing of the webbing 302 is detected, the program jumps to step Y6 and the sleep OUT flag is set. Then, the program is returned. On the other hand, when the drawing of the webbing 302 is not detected in step Y2, it is judged whether or not the door of the objective seat belt is closed (step Y3). When the corresponding door is not closed, the sleep OUT flag is set (step Y6). After that, the program is returned. On the other hand, when it is detected in step Y3 that the door of the objective seat belt is closed, it is judged whether or not the ignition switch (IG) is turned on (step Y4). In the case of "YES", the program proceeds to step Y6 and the sleep OUT flag is set. After that, the program is returned. On the other hand, when the result of the judgment made in step Y4 is "NO", the program proceeds to step Y5 and the sleep OUT flag is cleared. After that, the program is returned.

That is, in this processing, when the drawing is detected (step Y2) or when either the opening motion of the door (step Y3) or the ON motion of the ignition switch (IG) (step Y4) is detected, the sleep OUT flag is set (step Y6). Except for that, the sleep OUT flag is cleared (step Y5).

Second Embodiment

Next, the second embodiment of the present invention will be explained below.

In this second embodiment, when it is detected that a predetermined amount or more of the webbing has been drawn out during the clutch releasing operation, a previously set PWM (Pulse Width Modulation) duty ratio is increased so as to drive the motor.

This operation is conducted for preventing the occurrence of a problem in which the webbing is drawn out by a passenger during the release of the clutch and it becomes impossible to release the clutch. Usually, in order to positively release the clutch, the driving speed (the driving force) of the motor in the releasing direction is made to be sufficiently high and the driving time of the motor is made to be sufficiently long. However, it is not preferable to increase the driving speed because of an increase in the driving noise. On the other hand, when the driving speed is decreased, it becomes necessary to take a long time to conduct driving in the clutch releasing direction, and the response is delayed. Accordingly, when it is necessary to conduct winding immediately, there is a fear of delay of winding. Therefore, usually, the driving speed (the motor driving torque) is reduced and further the driving time is shortened. Setting is made so that the clutch can be released in the case where the webbing is not drawn out by a passenger during the release of the clutch so as to reduce the driving noise and increase the response speed. Then, when the webbing is drawn out by the passenger during the release of the clutch, PWM duty ratio is increased and the motor is driven so as to surely release the clutch.

In this case, the above predetermined amount of the webbing is set so that this control can not be conducted when the webbing is drawn out in the drawing direction by an elastic force of the clothes worn by the passenger who is releasing the clutch. It is preferable that the predetermined amount of the webbing is set at a value not less than an amount of the webbing to be drawn out by the elastic force generated by the clothes of the passenger. Due to the foregoing, it is possible to conduct the above actions only when the webbing is drawn out according to the passenger's will.

The retractor for a seat belt of the present invention can be preferably applied to all vehicles.

While the above description constitutes the preferred embodiment of the present invention, it will be appreciated that the invention is susceptible to modification, variation and change without departing from the proper scope and fair meaning of the accompanying claims.

The invention claimed is:

1. A retractor for a seat belt system for a vehicle comprising:
   a spindle on which a webbing is wound;
   a frame for pivotally holding the spindle;
   a spindle locking system means for stopping rotation of the spindle rotating in a webbing drawing out direction when at least one of the two following criteria is met:
      a rotational acceleration of the spindle is greater than a first predetermined value when the webbing is accelerated in the drawing out direction; and
      a deceleration of the vehicle is greater than a second predetermined value;
   a motor which generates a motor torque to rotate the spindle in the winding direction;
   a torque transmitting mechanism system which transmits the motor torque to the spindle,
   a control system for controlling the torque generated by the motor according to a seat belt fastening state and a dangerous state, the seat belt fastening state being one of a fastened seat belt state and a non-fastened seat belt state;
   a winding spring which generates a spring torque to rotate the spindle in a winding direction in which the webbing is wound onto the spindle, the winding spring being connected to the spindle at all times so as to transmit the generated spring torque to the spindle and being set to generate a spring torque insufficient for completely winding the webbing onto the spindle absent any other forces while the seat belt fastening state is the non-fastened seat belt state;
   a torque transmission cushioning system for cushioning a torque transmission by an elastic member arranged between the motor and the spindle, wherein when the motor torque is transmitted to the spindle, a sudden change in the motor torque is not transmitted to the spindle as a sudden change in torque, and wherein when the motor torque is transmitted to the spindle, a sudden force given to the spindle in the drawing out direction is not transmitted to the motor as a sudden change in force, the torque transmission cushioning system configured to be activated and deactivated by a clutch, a seat belt fastening state detecting system incorporated into a buckle, the seat belt fastening detection system being operable to detect the seat belt fastening state based on whether or not a tongue is engaged with the buckle; and a dangerous state detecting system for detecting whether or not the vehicle is in the dangerous state, wherein the motor is operated repeatedly, and the spring torque is configured to maintain a lower rotary speed of the spindle than the motor torque, wherein the control system is configured to compare an actual amount of drawing of the webbing determined by a count of an angular counter with a predetermined amount of drawing of the webbing when the seat belt fastening state is the non-fastened seat belt state, the predetermined amount being less than an amount of drawing of the webbing necessary for restricting a passenger seated in the seat, the control system further being configured to judge that the webbing cannot be wound only by the winding spring when the actual amount of drawing of the webbing is less than the predetermined amount and to activate the motor to wind up the webbing during the non-fastened seat belt state when the two following conditions are simultaneously met:
that the actual amount of drawing of the webbing is less than the predetermined amount; and
that the-spindle has stopped moving.

2. The retractor for the seat belt system according to claim 1, wherein the winding spring is a spiral spring.

3. The retractor for the seat belt system according to claim 1, wherein when the motor generates the motor torque for rotating the spindle in the winding direction, the torque transmitting mechanism system transmits the motor torque to the spindle, and
when the motor generates a second torque for rotating the spindle in the drawing out direction, the torque transmitting mechanism system does not transmit the second torque to the spindle.

4. The retractor for the seat belt system according to claim 3, wherein when the control system makes the motor generate the second torque in the drawing out direction, and when the webbing detecting system detects that an amount of webbing being drawn is greater than a third predetermined value, the control system makes the motor increase a rotary speed.

5. The retractor for the seat belt system according to claim 1, wherein the winding spring has a preset spring torque setting so that a predetermined tension is generated in the webbing when a seat belt user fastens the seat belt.

6. The retractor for the seat belt system according to claim 1, wherein an elastic force of the elastic member in the power transmission cushioning system is larger than the force generated by the winding spring when the elastic member is substantially compressed.

7. The retractor for the seat belt system according to claim 1, wherein when the fastened seat belt state and the dangerous state of the vehicle are detected, the control system makes the motor generate the motor torque for rotating the spindle in the winding direction.

8. The retractor for the seat belt according to claim 1, wherein when the fastened seat belt state and a change from the dangerous state of the vehicle to a not-dangerous state are detected, the control system makes the motor generate the motor torque at a level for rotating the spindle in the winding direction for a predetermined period of time; and
wherein the control system further makes the motor gradually reduce the torque with lapse of time, such that when the motor stops generating the torque, the control system makes the motor generate a predetermined second torque for rotating the spindle in the drawing out direction for a predetermined period of time.

9. A retractor for a seat belt system for a vehicle comprising:
a spindle on which a webbing is wound;
a frame for pivotally holding the spindle;
a spindle locking system means for preventing the webbing from drawing out and for stopping rotation of the spindle rotating in a webbing drawing out direction when at least one of the two following criteria is met:
a rotational acceleration of the spindle is greater than a first predetermined value when the webbing is accelerated in the drawing out direction; and
a deceleration of the vehicle is greater than a second predetermined value;
a motor which generates a motor torque to rotate the spindle in the winding direction; and
a torque transmitting mechanism system which transmits the motor torque to the spindle;
a webbing action detecting system for detecting a webbing action, the webbing action being one of a webbing drawing out state, a webbing winding state, and a webbing stoppage state;
a control system for controlling the motor torque according to a seat belt fastening state and the webbing action detected by the webbing action detecting system, the seat belt fastening state being one of a fastened seat belt state and a non-fastened seat belt state;
a winding spring which generates a spring torque to rotate the spindle in a winding direction in which the webbing is wound onto the spindle, the winding spring being connected to the spindle at all times so as to transmit the generated spring torque to the spindle and being set to generate a spring torque insufficient for completely winding the webbing onto the spindle absent any other forces while the seat belt fastening state is the non-fastened seat belt state;
a torque transmission cushioning system for cushioning a torque transmission by an elastic member arranged between the motor and the spindle, wherein when the motor torque is transmitted to the spindle, a sudden change in the motor torque is not transmitted to the spindle as a sudden change in torque, and when the motor torque is transmitted to the spindle, a sudden force given to the spindle in the drawing out direction is not transmitted to the motor as a sudden change in force, the torque transmission cushioning system configured to be activated and deactivated by a clutch; and
a seat belt fastening detection system integrated into a buckle, the seat belt fastening detection system being operable to detect the seat belt fastening state based on whether or not a tongue is engaged with the buckle,
wherein the motor is used repeatedly,
wherein the control system is configured to determine whether a vehicle door associated with the retractor is currently closed and to compare an actual amount of drawing of the webbing determined by a count of an angular counter with a predetermined amount of drawing of the webbing when the seat belt fastening state is the non-fastened seat belt state, the predetermined amount being less than an amount of drawing of the webbing necessary for restricting a passenger seated in the seat, the control system further being configured to judge that the webbing cannot be wound only by the winding spring only when three conditions are simultaneously met:
that the actual amount of drawing of the webbing is less than the predetermined amount;
that the-spindle has stopped moving; and
that the seat belt fastening state is the non-fastened seat belt state;
wherein the spring torque is configured to remove slack in the seat belt webbing when the tongue is engaged with the buckle, but constantly incapable of completely winding up the webbing when the tongue is not engaged with the buckle.

10. The retractor for the seat belt system according to claim 9, wherein when the seat belt fastening detecting system detects a change from the fastened seat belt state to the non-fastened seat belt state, and the webbing action detecting system further detects that the webbing is in the webbing stoppage state, the control system makes the motor generate a predetermined intensity of the motor torque for rotating the spindle in the winding direction.

11. The retractor for the seat belt system as set forth in claim 10, wherein the control system makes the motor generate the motor torque at a level greater than a predetermined level of torque required for rotating the spindle in the winding direction.

12. The retractor for the seat belt system according to claim 9, wherein when the non-fastened seat belt state, the webbing drawing out state, and the webbing stoppage state are detected, the control system makes the motor generate a predetermined intensity of the motor torque for rotating the spindle in the winding direction.

13. The retractor for the seat belt system according to claim 9, wherein when the non-fastened seat belt state and a webbing stoppage state are detected, and when the motor is generating the motor torque for rotating the spindle in the winding direction,
the control system stops the generation of the motor torque for a predetermined period of time, and then the control system controls the motor to generate a second torque in the drawing direction.

14. The retractor for the seat belt system according to claim 9, wherein when a change from the non-fastened seatbelt state to the fastened seat belt state is detected, the control system makes the motor generate the motor torque for rotating the spindle in the winding direction, and
when the webbing stoppage state is detected, the control system makes the motor generate a second torque to rotate the spindle in the drawing out direction for a predetermined period of time.

15. The retractor for the seat belt system according to claim 9, wherein the webbing action detecting system detects the webbing action by detecting a rotary speed and a rotary direction of the spindle,
wherein when the webbing action detection system detects a predetermined increase in the rotary speed of the spindle in a predetermined period of time, the webbing action detection system determines that the webbing is in the webbing drawing out state if the webbing action detection system further detects that the rotary direction of the spindle corresponds to the drawing out direction, and the webbing action detecting system determines that the webbing is in the webbing winding state if the webbing action detection system further detects that the rotary direction of the spindle corresponds to the winding direction, and
wherein the webbing action detection system determines that the webbing is in the webbing stoppage state when the webbing is not in either the webbing drawing out state or the webbing winding state.

16. The retractor for the seat belt system according to claim 9, further comprising:
a dangerous state detecting system for detecting whether or not a vehicle is in a dangerous state, the dangerous state being one of an actual or potential collision,
wherein when the dangerous state detecting system detects the dangerous state and the seat belt fastening detection system detects a fastened seat belt state, the control system makes the motor generate the motor torque for rotating the spindle in the winding direction.

17. The retractor for the seat belt system according to claim 16, wherein when a change from the dangerous state of the vehicle to a not-dangerous state is detected, the control system makes the motor generate the motor torque for rotating the spindle in the winding direction for a predetermined period of time and at a level higher than a predetermined level of torque required for rotating the spindle, and
wherein the control system further makes the motor gradually reduce the motor torque with lapse of time, such that when the motor stops generating the torque, the control system makes the motor generate a predetermined intensity of a second torque for rotating the spindle in the drawing out direction for a predetermined period of time.

18. The retractor for the seat belt system according to claim 16, wherein when the dangerous state of the vehicle and a change from the fastened seat belt state to the non-fastened seat belt state are detected, the control system makes the motor generate a predetermined second torque for rotating the spindle in the drawing out direction for a predetermined period of time.

19. The retractor for the seatbelt system according to claim 9, wherein the webbing action detecting system detects the webbing action by detecting a rotary speed and a rotary direction of the spindle.

* * * * *